(12) United States Patent
Tanaka et al.

(10) Patent No.: US 8,295,268 B2
(45) Date of Patent: Oct. 23, 2012

(54) IP DEVICE, MANAGEMENT SERVER, AND NETWORK SYSTEM

(75) Inventors: Masataka Tanaka, Fukuoka (JP); Hideki Shuto, Fukuoka (JP); Yuji Arima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 12/268,139

(22) Filed: Nov. 10, 2008

(65) Prior Publication Data

US 2009/0059945 A1 Mar. 5, 2009

Related U.S. Application Data

(62) Division of application No. 11/031,284, filed on Jan. 10, 2005, now abandoned.

(30) Foreign Application Priority Data

| Jan. 9, 2004 | (JP) | 2004-003868 |
| Apr. 14, 2004 | (JP) | 2004-118616 |
| Apr. 14, 2004 | (JP) | 2004-118617 |

(51) Int. Cl.
*H04L 12/28* (2006.01)
(52) U.S. Cl. .......... 370/351; 709/227
(58) Field of Classification Search .......... None
See application file for complete search history.

(56) References Cited

U.S. PATENT DOCUMENTS

| 5,815,664 | A | 9/1998 | Asano |
| 6,128,664 | A | 10/2000 | Yanagidate |
| 6,477,577 | B1 | 11/2002 | Asano |
| 7,003,799 | B2 * | 2/2006 | Jorgenson .......... 726/12 |
| 7,418,511 | B2 | 8/2008 | Takechi |
| 7,533,164 | B2 * | 5/2009 | Volz et al. .......... 709/223 |
| 2003/0152038 | A1 | 8/2003 | Oshima |
| 2003/0177236 | A1 * | 9/2003 | Goto et al. .......... 709/225 |
| 2004/0019682 | A1 * | 1/2004 | St. Pierre .......... 709/227 |
| 2005/0021603 | A1 | 1/2005 | Yokomitsu |

FOREIGN PATENT DOCUMENTS

JP 8-263413 10/1996
(Continued)

OTHER PUBLICATIONS

English Translation of Notification of Reasons for Refusal issued on Jul. 14, 2009 for corresponding Japanese Patent Application.

(Continued)

*Primary Examiner* — Nittaya Juntima
*Assistant Examiner* — Rhonda Murphy
(74) *Attorney, Agent, or Firm* — Dickinson Wright PLLC

(57) ABSTRACT

An IP device (for example, network cameras 3a, 3b, and 3c) connectable to a router (for example, a router 2) makes a request to the router for assignment of a port number when a predetermined operation is performed, and notifies a management server 6 connected to a wide area network of address data containing an assigned port number when the port number is assigned from the router, wherein address data containing the port number can be registered in the management server 6 on the wide area network, so that, even when access is made from the terminal 4 on the wide area network side with a port number that is locally updated, access is made possible by transmitting address data of the IP device to the terminal 4.

8 Claims, 21 Drawing Sheets

FOREIGN PATENT DOCUMENTS

| | | |
|---|---|---|
| JP | 09064905 | 3/1997 |
| JP | 9-325931 | 12/1997 |
| JP | 10-247946 | 9/1998 |
| JP | 11-17726 | 1/1999 |
| JP | 11-122301 | 4/1999 |
| JP | 11-187061 | 7/1999 |
| JP | 2000-36840 | 2/2000 |
| JP | 2002082957 | 3/2002 |
| JP | 2002351771 | 12/2002 |
| JP | 2003-198586 | 7/2003 |
| JP | 2003-273896 | 9/2003 |
| JP | 3445986 | 9/2003 |
| JP | 2003-283570 | 10/2003 |
| JP | 2004-112018 | 4/2004 |
| JP | 2004-144817 | 5/2004 |
| JP | 2004266320 | 9/2004 |
| WO | 03079642 | 9/2003 |

OTHER PUBLICATIONS

English Translation of Japanese Office Action dated Sep. 8, 2009.
English translation of Japanese Office Action dated Jun. 23, 2009.
U.S. Appl. No. 10/760,552.
Partial International Search Report dated Apr. 22, 2005.
Schmitz M, et al., "WANIPConnection: 1 Service Template Version 1.01," UPNP Forum Standard, XP002298367, pp. 1-33, Nov. 12, 2001.
Samdarshi Pali, "Setting up Web Services using Dynamic Domain Name Server (DDNS)," XP002238057, 3 pages total, Jul. 28, 2001.
GB Search Report dated Dec. 30, 2008.

* cited by examiner

FIG. 4

| NO. | CAMERA ID | ACCESS ID | PASS-WORD | PORT NUMBER | LOCAL IP ADDRESS | INTERNAL PORT NUMBER | EXTERNAL IP ADDRESS | GROUP ID |
|---|---|---|---|---|---|---|---|---|
| | 41 | 42 | 43 | 44 | 45 | 46 | 47 | 48 |
| 1 | 00:02:2F:92:D7:32 | 35178913 | 3ZD45E | 8080 | 192.168.0.2 | 80 | 60.1.2.3 | camera001 |
| 2 | 00:02:2F:3A:B2:12 | 79326004 | 7PQ1A2 | 8081 | 192.168.0.3 | 80 | 60.1.2.3 | camera001 |
| 3 | 00:02:2F:4E:D2:56 | 41952763 | 9MN5DL | 8082 | 192.168.0.4 | 80 | 60.1.2.3 | camera001 |
| ...... | ...... | ...... | ...... | ...... | ...... | ...... | ...... | ...... |

FIG. 9

| NO. | MAC ADDRESS | ACCESS ID | PASS-WORD | WAN SIDE PORT NUMBEER | IP ADDRESS | LAN SIDE PORT NUMBER | WAN SIDE IP ADDRESS | DOMAIN NAME |
|---|---|---|---|---|---|---|---|---|
| | 41 | 42 | 43 | 44 | 45 | 46 | 47 | 48 |
| 1 | 00:22:33:44:D7:32 | 35178913 | 3ZD45E | 8080 | 192.168.0.2 | 80 | 60.1.2.3 | camera001 |
| 2 | 00:22:33:44:B2:12 | 79326004 | 7PQ1A2 | 8081 | 192.168.0.3 | 80 | 60.1.2.3 | camera002 |
| 3 | 00:22:33:44:D2:56 | 41952763 | 9MN5DL | 8082 | 192.168.0.4 | 80 | 60.1.2.3 | camera003 |
| ..... | ..... | ..... | ..... | ..... | ..... | ..... | ..... | ..... |

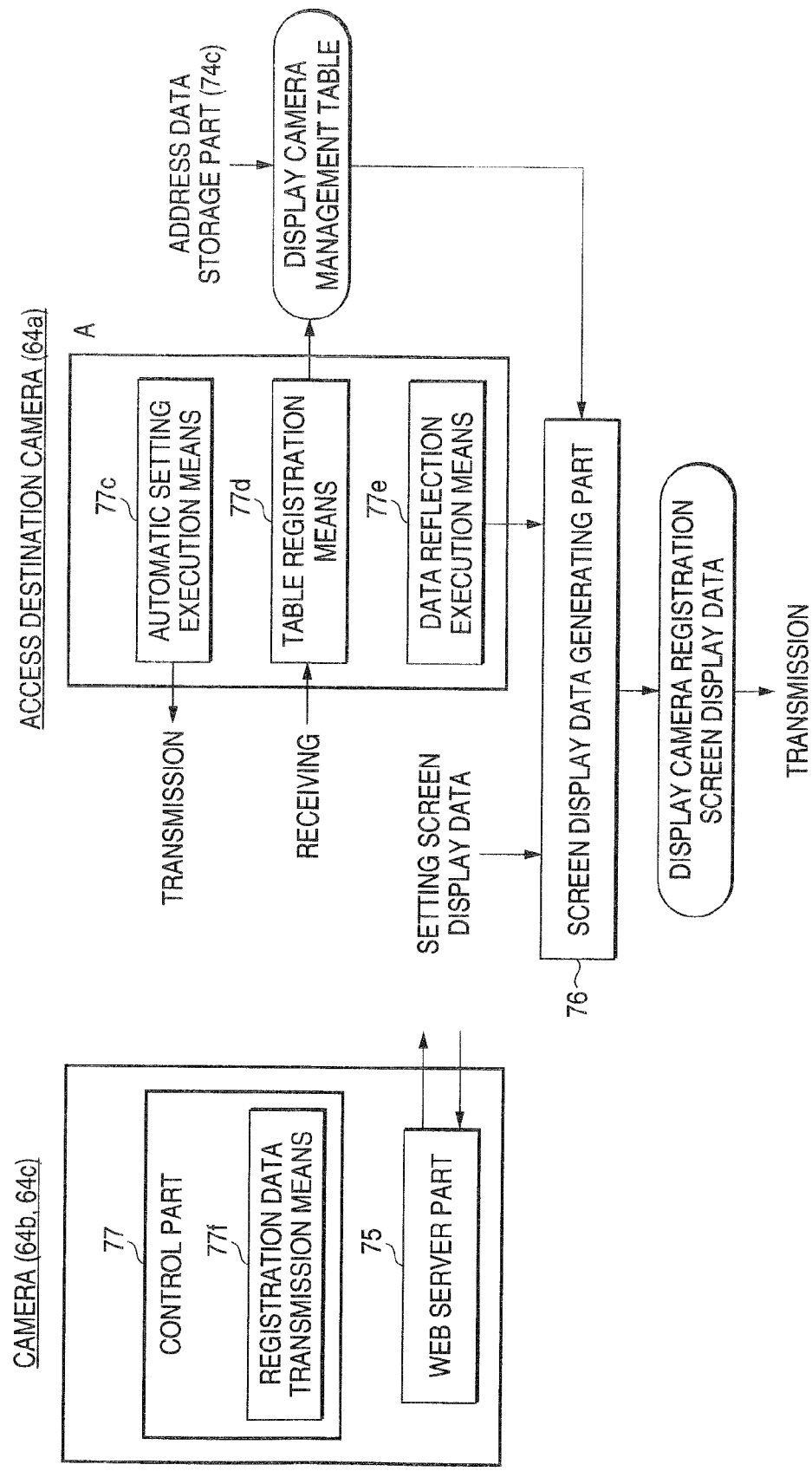

FIG. 18

| REGISTER NUMBEER | HOST NAME | MAC ADDRESS | IP ADDRESS | PORT NUMBEER |
|---|---|---|---|---|
| 1 | camera001 | 00800FF445510 | 192.168.0.151 | 8001 |
| 2 | camera002 | 00800FF445520 | 192.168.0.152 | 8002 |
| 3 | camera003 | 00800FF445530 | 192.168.0.153 | 8003 |

IP DEVICE, MANAGEMENT SERVER, AND NETWORK SYSTEM

This is a divisional application of application Ser. No. 11/031,284 filed Jan. 10, 2005 (pending) which is based on and claims priority of Japanese Application No. 2004-003868, filed Jan. 9, 2004, Japanese Application No. 2004-118616, filed Apr. 14, 2004 and Japanese Application No. 2004-118617, filed Apr. 14, 2004.

BACKGROUND OF THE INVENTION

The present invention relates to an IP device which can register access data in a management server by being connected to a router and assigned with a port number for port forwarding, a management server which registers this access data and provides address data of this IP device to a terminal that accesses via a wide area network, and a network system comprising these.

ADSL and CATV for constant connection to a wide area network such as the Internet have spread on a full scale, and broadband routers have widely spread. However, with the current IP protocol IPv4, the absolute number of global IP addresses is insufficient, so that the shortage of global IP addresses is covered by using the NAT (Network Address Translation) function and the port forwarding function (static IP masquerade). This NAT function converts a local IP address of a LAN-side device into a global IP address of the WAN side of a router when the LAN-side device accesses the Internet.

Furthermore, when access is made to a specific device on the LAN side from the Internet, the access can be made by using a port forwarding function (static IP masquerade) of a router. Namely, for this, a conversion table of port numbers and local IP addresses must be set in the router in advance. When access is made from the Internet, a global IP address and a port number of the router are specified. The router that has accepted this access converts the global IP address into a local IP address according to the conversion table set in advance. By this conversion, access can be made to one device having the local IP address within a LAN from the Internet.

Thus, a conventional router connects a plurality of user devices and the Internet by alleviating the exhaustion of global IP addresses by the port forwarding function and the NAT function, however, a user must know the port number of the LAN side device and manually set and change it.

Therefore, by the UPnP forum, standards for dynamic port forwarding (port mapping) are created (refer to UPnP standards). In the settings of the standards, a subordinate terminal inquires to a router whether or not a port is usable, and when it is usable, the router registers it, and when it is unusable, the terminal inquires whether or not the port is usable again, and this is repeated until usability is determined. According to the UPnP standards, a manual port forwarding setting is not necessary, and the port number of the Internet side can be automatically set without depending on the vendor of the router.

The UPnP standards can be browsed at URL: http://www.upnp.org/standardizeddcps/default.asp (searched on Nov. 29, 2002).

However, since the port number is automatically selected, a user on the Internet side cannot know which port number is assigned to which of the terminals. In order for a user on the Internet side to access a device on the LAN side, he/she must know the port number thereof. From the inside of the LAN, port numbers to be used by each of the terminals can be confirmed by using a user interface (web page) of a router or a terminal, however, from the Internet side (outside), a user interface of a router cannot be used by reason of security.

Therefore, the present applicant proposed a method in which, when a plurality of IP devices exist under the router and make communications by being assigned with ports, respectively, according to the UPnP standards, a representative device is selected among the devices and made to manage address data and provide address data of other devices for access from a wide area network (Japanese Patent Application No. 2003-12241, equivalent to U.S. patent application Ser. No. 10/760,552). For example, a representative device is selected among a plurality of IP devices (for example, network cameras) under a router, and is provided with a fixed port number "80." Thereby, by accessing the representative device from a wide area network side, access to other devices becomes possible.

However, when images of the plurality of network cameras are browsed from a client terminal, the terminal must access the network cameras one by one, and the access time becomes long and this is troublesome and inconvenient. Therefore, it is convenient if a plurality of images can be displayed at a time in a list and image data can be acquired from the network by accessing by using the list. For example, conventionally, a system for displaying a list of thumbnails of a plurality of images has been proposed (Japanese Unexamined Patent No. 2002-82957).

Furthermore, an image communications method has also been proposed in which a desired image is selected while displaying a plurality of images (Japanese Unexamined Patent No. 2002-351771). In this method, when a client sends a request while any of the images held by an image server are displayed or the images are displayed in order, the image server sends the image being displayed to the client.

As described above, the conventional port forwarding function (static IP masquerade) of a router can make access to a LAN side device by using a port number, however, a user on the Internet side must know the port number of the LAN side device, and when the port number is changed due to a system change on the LAN side, the change must be manually followed up.

Furthermore, when port forwarding setting is dynamically made according to the standards of the UPnP forum, a terminal inquires to a router whether a port is usable, and when it is usable, it is registered, and when it is unusable, the terminal repeatedly inquires, however, the router automatically selects a port number, so that a user on the Internet side cannot know which of the port numbers is assigned to the terminal.

The present applicant also proposed an access method by using a representative device, however, in the access method, the port number of the representative device must be fixed, and when a fixed port number is unusable, access to the representative device is impossible, and as a matter of course, access to all devices becomes impossible. For example, a port number "80" is used for communications by HTTP, however, in a case where this port number is reserved by a router for another use, this port number cannot be assigned to the representative device, so that access becomes impossible.

SUMMARY OF THE INVENTION

Therefore, an object of the invention is to provide a device which can be assigned with a port number for port forwarding and can be accessed from a wide area network side by registering address data in a management server on the wide area network. Furthermore, another object of the invention is to provide a management server which is connected to a wide area network, registers address data of an IP device that has been assigned with a port number for port forwarding to make it easy to access this IP device from the wide area network side.

In order to achieve the above-mentioned objects, the invention relates to an IP device connectable to a router, which requests the router to assign a port number when a predetermined operation is performed, and when a port number is assigned from the router, notifies a management server connected to a wide area network of address data containing the assigned port number, wherein the IP device is assigned with a port number for port forwarding and can register address data containing the port number that is to be updated in the management server on the wide area network, so that even with a port number that is locally updated, access from the wide area network side can be made. Furthermore, the IP device notifies the management server of IP device data and/or a domain name to be used in the DDNS service in addition to the address data, whereby the IP device is easily specified.

Furthermore, the management server searches within an IP device management table on the basis of an ID supplied by user authentication and returns page data for displaying a list of IP devices, whereby authentication is performed before the management server transmits page data for displaying a list for specifying an IP device, so that it becomes unnecessary to transmit the IP device list data to unauthorized users, and this reduces the burden on the management server and realizes high security without connection to the IP device itself.

Furthermore, the IP device requests the router to assign a port number, performs automatic setting concerning the network, and transmits a connection check request meaning a request for connection to itself to the management server and judges the end of automatic setting by an affirmative response that is outputted when the IP device can respond to a connection request from the management server, whereby access from the wide area network side can be made even with a port number that is locally updated, and the end of automatic setting can be reliably judged.

Furthermore, in a case where an IP device has an image data transmission function and can transmit portal screen display data when it is accessed from a terminal through a network, and can transmit images outputted by itself or other devices within a local area network to external terminals through the network, when the network data is registered by automatic setting, a network data acquiring request is broadcasted, a network data acquiring response is received from other devices within the local area network, and the network data is registered in the display camera management table within the IP device, whereby a plurality of images to be displayed on a portal screen display can be displayed easily in a list.

BRIEF DESCRIPTION OF THE DRAWINGS

FIG. 4 is a composition diagram of an IP device management table in Embodiment 1 of the invention;

FIG. 9 is a composition diagram of a management table of the management server in Embodiment 2 of the invention;

FIG. 18 is an explanatory view of a display camera management table;

DETAILED DESCRIPTION OF THE PREFERRED EMBODIMENTS (Embodiment 1)

Figure 1:
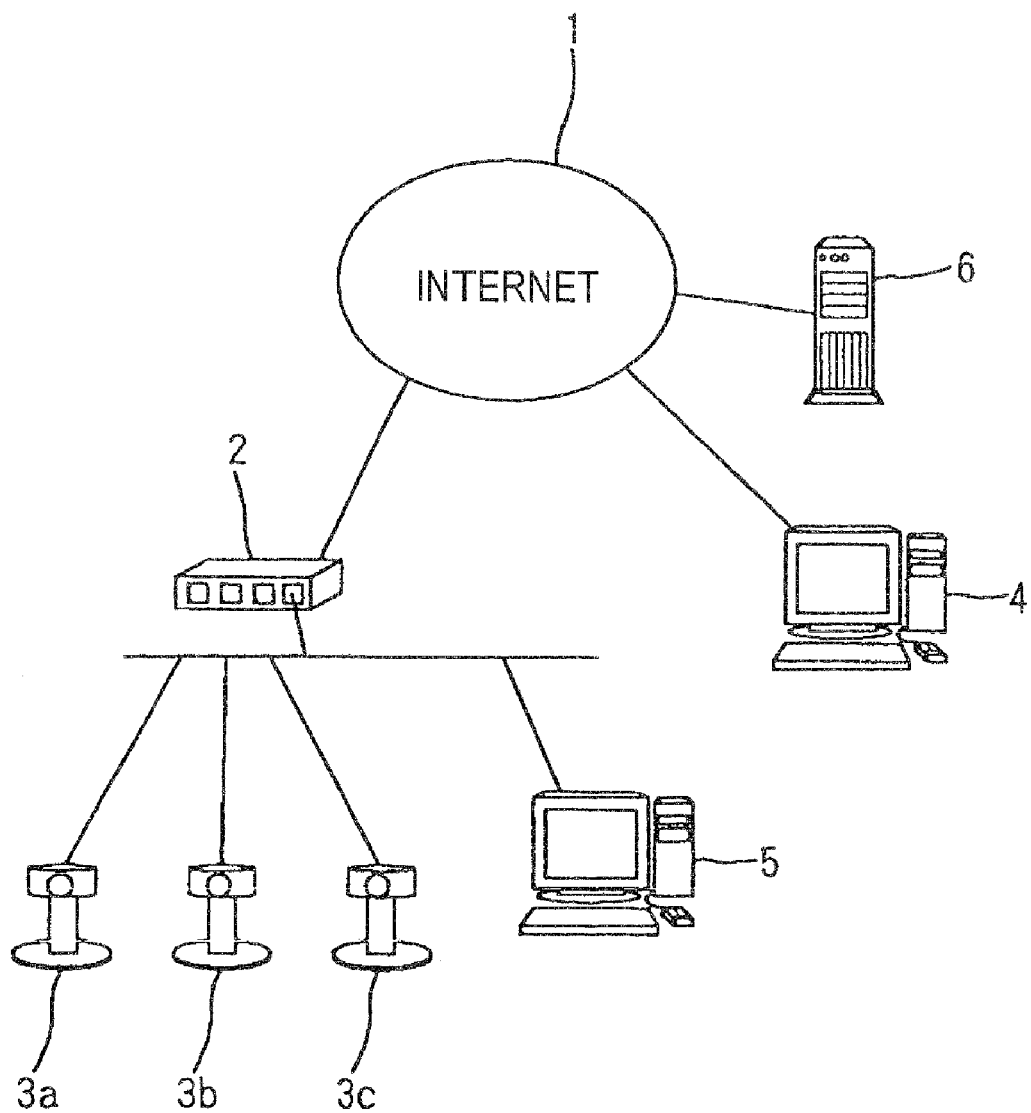
FIG. 1 is a construction diagram of a network system that accesses network cameras under a router in Embodiment 1 of the invention.
Figure 2:
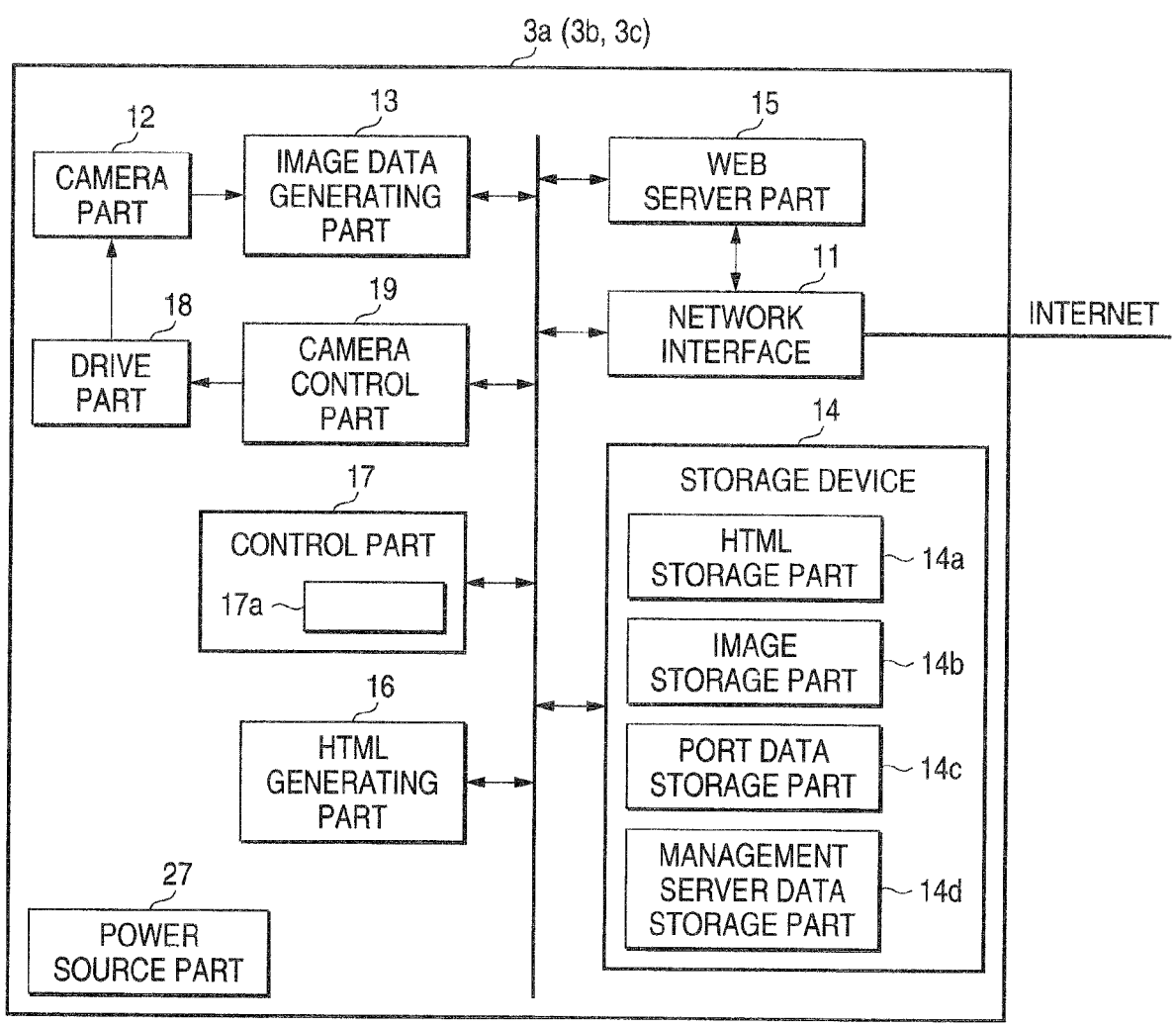
FIG. 2 is a function block diagram of the network camera in Embodiment 1 of the invention.
Figure 3:
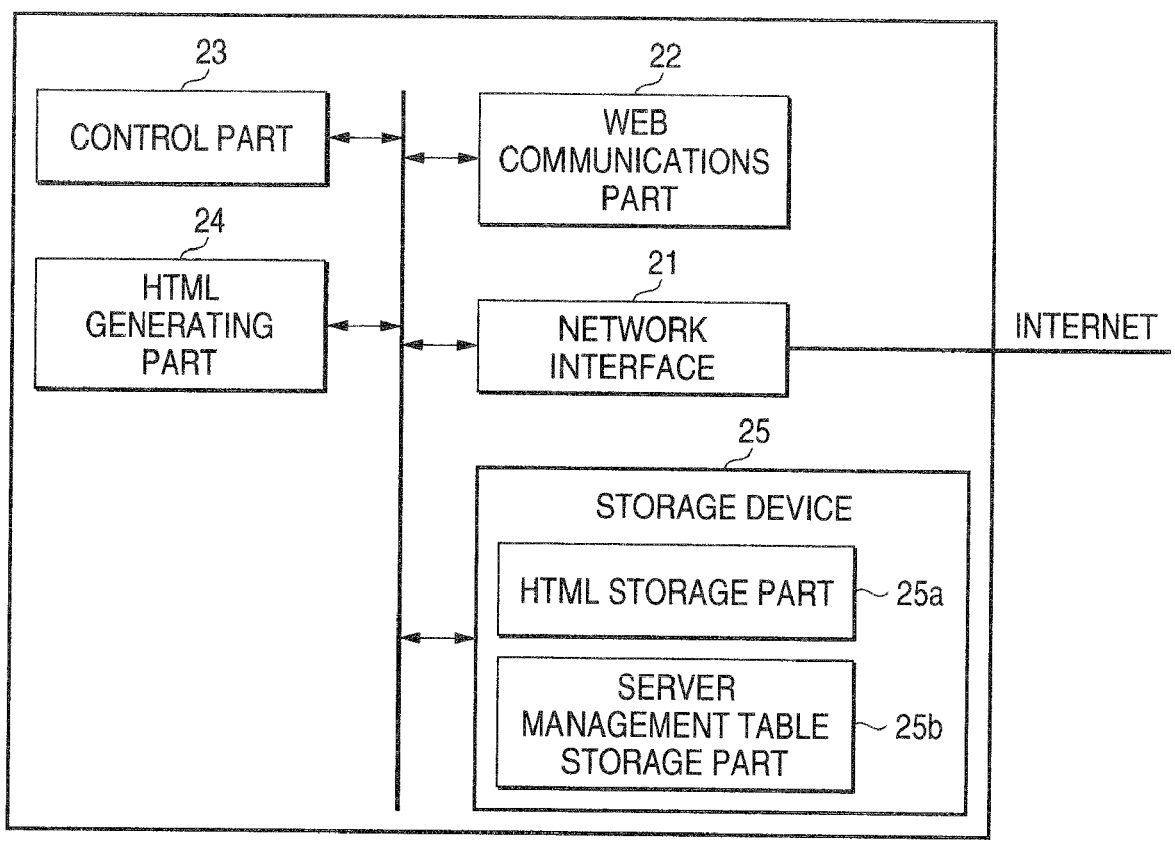
FIG. 3 is a construction diagram of a management server in Embodiment 1 of the invention.

IP devices under a router and a management server on the Internet in Embodiment 1 of the invention are described. FIG. 1 is a construction diagram of a network system in which access to network cameras under the router is made in Embodiment 1 of the invention, and FIG. 2 is a function block diagram of the network camera in Embodiment 1 of the invention, and FIG. 3 is a construction diagram of a management server in Embodiment 1 of the invention.

In FIG. 1, the reference numeral 1 denotes the Internet (a wide area network of the invention). The reference numeral 2 denotes a router (a router of the invention) that has an interface connectable to the Internet 1, has a plurality of LAN side ports, and performs routing for subordinate IP devices (for example, network cameras 3*a*, 3*b*, and 3*c* described later), and has a function of dynamic port forwarding of an IP packet according to, in particular, the UPnP standards. The reference numerals 3*a*, 3*b*, and 3*c* denote network cameras (IP devices of the invention).

The terminal 4 can access the network cameras 3a, 3b, and 3c by being connected to the Internet 1, the DHCP (Dynamic Host Configuration Protocol) server 5 assigns IP addresses to the network cameras 3a, 3b, and 3c among predetermined local IP addresses (hereinafter, referred to as IP addresses) within a LAN.

The management server 6 becomes a first access destination in the case of accessing the network cameras 3a, 3b, and 3c from the terminal 4. When access is made from the terminal 4 to the network cameras 3a, 3b, and 3c, first, the management server is accessed, and the management server 6 replies with a web page containing links to global IP addresses (hereinafter, referred to as external IP addresses) to the terminal 4.

In Embodiment 1, when the network cameras 3a, 3b, and 3c are connected to the router 2, the cameras detect connection to the router 2, and accordingly, they automatically request the router 2 to assign ports. The router 2 that has received the assignment request gives the cameras assignable port numbers and registers them. For example, when the network camera 3a is connected to the router 2 and requests assignment of a port number, the router 2 assigns, for example, "8080" among assignable predetermined port numbers. By this assignment and the port forwarding function of the router 2, access can be made to the network camera 3a assigned with this port number "8080" from the Internet 1 side. Likewise, the network cameras 3b and 3c request assignment of port numbers and are assigned with port numbers, for example, "8081" and "8082," respectively, whereby access to the network cameras 3a, 3b, and 3c with these port numbers from the Internet 1 side becomes possible. Furthermore, the network cameras 3a, 3b, and 3c notify the management server 6 of the assigned port numbers after the network cameras are assigned with the port numbers. Thereby, when a user wants to access the network cameras 3a, 3b, and 3c from the terminal 4, the access becomes possible by accessing the management server 6 from the terminal 4.

In the above-mentioned example, connection to a router is detected and port assignment is accordingly automatically requested to the router 2, and it is also possible that port assignment is requested by turning the power sources of the network cameras ON after they are connected to the router, or port assignment is requested by easy manual operation.

Then, the internal constructions of the network cameras 3a, 3b, and 3c and the management server 6 of Embodiment 1 are described with reference to FIG. 2 and FIG. 3. First, the network cameras 3a, 3b, and 3c are described. In FIG. 2, the reference numeral 11 denotes a network interface between the network cameras 3a, 3b, and 3c and the Internet 1, which transmits a request from a browser of the terminal 4 to the network cameras 3a, 3b, and 3c and transmits files described in markup language such as HTML, etc., for displaying a web page from the network cameras 3a, 3b, and 3c to the Internet 1. The reference numeral 12 denotes a camera part, and the reference numeral 13 denotes an image data generating part which processes video signals from a CCD or CMOS image pickup device provided in the camera part 12 and compresses the signals into the JPEG-format, MPEG format, or other compression format.

The storage device 14 memorizes control programs and various data, and the HTML storage device 14a stores a plurality of web pages (web information) describing display instructions and link data in a markup language such as HTML, etc., the image storage device 14b stores image data compressed by the image data generating part 13, and the address data storage part 14c stores assigned port data. The management server data storage part 14d stores an address and the like of the destination management server 6 for transmitting address data of the network cameras 3a, 3b, and 3c to the management server 6.

The web server part 15 communicates with the Internet 1 by the protocol TCP/IP. The HTML generating part 16 extracts and generates a web page composed by HTML, etc., for a browser from the storage device 14 when the browser of an external (Internet 1 side) terminal 4 accesses the web server part 15, and transmits the web page. The control part 17 is constructed as a function realizing means for performing various functions by reading control programs into a central processing unit (CPU). The port management means 17a manages port data. The port management means 17a performs registration processing for port number assignment, and when registration is finished, it notifies the management server 6 of the port numbers. The drive part 18 consists of a motor, etc., for operation such as panning and tilting of the camera part 12, and the camera control part 19 drives the drive part 18.

The control part 17 generates a web page by processing a request from a browser and operating the HTML generating part 16, extracts image data to be transmitted to the browser from the storage device, and furthermore, makes the camera control part 18 operate by specifying a mode. The power source part 27 is for supplying electrical power to the respective parts.

Next, the internal construction of the management server 6 is described. In FIG. 3, the reference numeral 21 denotes a network interface to the Internet, 22 denotes a web communications part which communicates with the Internet 1 by the protocol TCP/IP, and 23 denotes a control part. The control part 23 is also constructed as the above-mentioned function realizing means. The HTML generating part 24 extracts, generates, and transmits a web page composed by HTML, etc., from the storage device 14 to a browser of a terminal 4 when it is accessed by the browser, and when ID data (authentication data of the invention) such as an ID and password, etc., sent from the terminal 4 are authenticated, the HTML generating part extracts address data of the corresponding network camera 3a, 3b, or 3c from a management table storage device 25b described later, generates a web page provided with a link to this URL and transmits the web page to the terminal 4.

The storage device 25 memorizes control programs and various data, the HTML storage device 25a stores a plurality of web pages for authentication and access to network cameras described in a markup language such as HTML, etc., and the management table storage device 25b stores a server management table composed of port data, IP addresses, ID data, and passwords, etc., assigned to the network cameras 3a, 3b, and 3c. The management table storage device 25b also stores an external IP address of the router 2.

The management server 6 updates the port numbers of the management table storage device 25b when being notified of port numbers from the network cameras 3a, 3b, and 3c, and transmits a web page for server specification and authentication when being accessed from the terminal 4 through the Internet 1, and when ID data inputted therein and memorized authentication data match, the management server generates and transmits a web page provided with a link to the URL of a corresponding network camera 3a, 3b, or 3c to the terminal 4.

When access is made from the terminal 4 through the Internet 1, it is also preferable that a web page for server specification and authentication is returned back to the terminal 4, a server management table is searched based on the ID supplied by user authentication, and a web page displaying a list of the network cameras 3a, 3b, and 3c is transmitted.

Authentication is made before the web page for displaying a list for specifying the network cameras 3a, 3b, and 3c is transmitted, so that it becomes unnecessary to transmit the server list data to unauthorized users, this reduces the burden on the management server 6 and increases the security without connection to the server itself. Furthermore, on the basis of the results of authentication, it becomes possible to judge which of servers is to be displayed in the list, and only servers corresponding to users who access from the wide area network side can be displayed in a list.

Furthermore, it is also possible that, when the list of the network cameras 3a, 3b, and 3c connectable in response to a connection request from the terminal 4 is returned and the terminal 4 selects one of these, a request for authentication of the network cameras 3a, 3b, and 3c is made, and only when authentication succeeds, a web page containing a link to the network cameras 3a, 3b, and 3c is transmitted. When the terminal 4 is connected to the server by automatic jumping, the burden in authentication on the management server is reduced.

Furthermore, it is also possible that, when access is made from the terminal 4, for example, a keyword "camera001" containing an authentication keyword corresponding to the network camera 3a, 3b, or 3c connected under the router 2 is taken into the URL and access is made with http://www.service.co.jp/camera001, whereby the management server 6 specifies a server group or a server and returns a web page containing a hyperlink to the specified network camera 3a, 3b, or 3c. In this case, when access is made from the terminal 4 through the Internet 1, one name (authentication keyword) corresponding to the server is contained in the URL for specifying the network camera 3a, 3b, or 3c. By using this keyword as a key, the management server 6 displays a list of a server group containing a link to connectable servers, or transmits page data for automatically jumping to the network camera 3a, 3b, or 3c when only one corresponding server exists. Thereby, the step of operation for specifying the server can be omitted. Furthermore, for security, it is also possible that a user authentication procedure (ID and password confirmation) is taken before displaying.

Likewise, it is possible that, by accessing with, for example, http://YYY.service.co.jp/camera001 containing a domain name corresponding to the WAN side IP address of the router 2 and each name provided for the network cameras 3a, 3b, and 3c connected under the router 2, the management server 6 specifies the network camera 3a, 3b, or 3c and returns a web page containing a hyperlink to a specified server. In this case, each name (authentication keyword) for specifying the network camera 3a, 3b, or 3c is contained in the URL. By using this keyword as a key, the management server 6 displays a list containing a link to the connectable network camera 3a, 3b, or 3c, or when only one corresponding server exists, the management server transmits page data for automatically jumping to the server. Thereby, the step of operation for specifying the server can be omitted. For security, it is also possible that a user authentication procedure (ID and password confirmation) is taken before displaying.

Hereinafter, the composition of the server management table is described. FIG. 4 is a composition diagram of a server management table in Embodiment 1 of the invention. In the server management table shown in FIG. 4, the reference numeral 41 indicates a camera ID such as a MAC address of a network camera (for example, "00:02:2F:92:D7:32") or a unique ID (for example, a unique URL "miemasu.net/camera001/). Other codes may be used as long as they are unique, however, the MAC address unique to the product is desirable.

The reference numeral 42 indicates an access ID. When a user buys the product, an ID number, for example, "35178913" is entered by the manufacturer side on a document attached by the manufacturer, and at the time of shipment, this ID and a MAC address are registered in the management server 6, and the user who has been authenticated with this ID number "35178913" is allowed to access the network camera. Even if the access ID 42 is not provided, the MAC address of the camera ID 41 can be used instead.

The reference numeral 43 indicates a password, and at the time of shipment, a default password is set and entered on an attached document as well as the ID, and after the user is successfully authenticated, the password can be changed to a user unique value, for example, "3ZD45E," by using an interface that can be set by the user side. The camera ID (for example, MAC address) 41, the access ID 42, and the password 43 correspond to the server data of the invention, and among these pieces of data, the access ID 42 and the password 43 are authentication data of the invention.

The reference numeral 44 indicates a port number assigned by the UPnP-enabled router 2, and is notified from the network camera 3a, 3b, or 3c. The router 2 has predetermined assignable port numbers, and updates each port number in response to a request from each network camera, and each network camera notifies the management server 6 of this number. Therefore, the port number is updated for each notification.

The reference numeral 45 indicates a local IP address of the network camera 3a, 3b, or 3c. The local IP address 45 is assigned by the DHC server 5, and for example, when the IP address of the router 2 is "192.168.0.1," the network camera 3a is set to, for example, "192.168.0.2" and this is notified as well as the above-mentioned port number. The reference numeral 46 indicates a LAN side port number. The port number 44, the local IP address 45, and the LAN side port number 46 compose the address data of the invention. The reference numeral 47 indicates an external (WAN side) IP address of the router 2, and the reference numeral 49 indicates a group ID to be provided for a server group.

In Embodiment 1, when the network cameras 3a, 3b, and 3c are connected (or the power sources thereof are turned ON), they are assigned with IP addresses and port numbers by the router 2, and the management server 6 is notified of these address data and the camera IDs (for example, MAC addresses) 41, the access IDs 42, and the passwords 43, and these are registered in the server management table. The access IDs 42 and the passwords 43 are set in advance.

In this state, when the terminal 4 accesses the management server 6 through the Internet 1, the management server 6 transmits a web page for network camera specification and authentication, specifies a network camera by the camera ID (for example, the MAC address) 41 transmitted from the terminal 4 side, and performs authentication with the access ID 42 and the password 43. When these are authenticated, a web page added with a link to the URL of the corresponding network camera 3a, 3b, or 3c is transmitted, and the terminal 4 automatically accesses the link destination, so that the terminal 4 side can make accesses even without knowing the port numbers of the network cameras 3a, 3b, and 3c.

Figure 5:
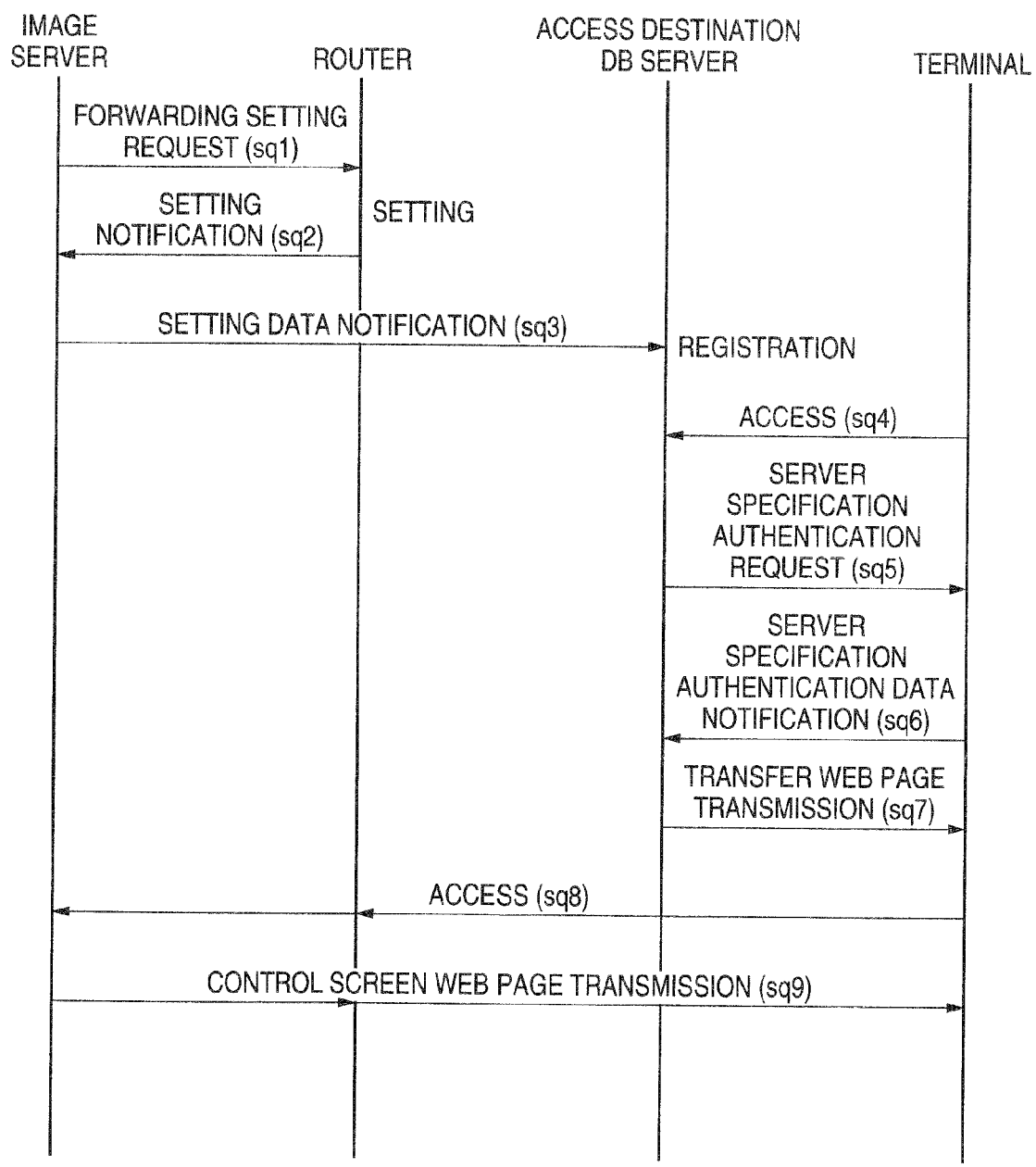
FIG. 5 is an explanatory view of sequences among the network camera, the management server and a terminal in Embodiment 1 of the invention.

Next, sequences to be taken among the network cameras 3a, 3b, and 3c, the router 2, the management server 6, and the terminal 4 are described on the basis of FIG. 5. FIG. 5 is an explanatory view of sequences among the network cameras, the management server, and the terminal in Embodiment 1 of the invention. As shown in FIG. 5, for example, the network camera 3a is connected to a LAN, turned ON, or manually operated, and requests the DHCP server 5 to assign an IP address, and makes a forwarding request to the UPnP-enabled router 2 (sq1), the router 2 assigns a port number and transmits port number setting notification to the network camera 3a (sq2). The network camera 3a transmits the initially set camera ID (for example, MAC address) 41, access ID 42, and password 43 to the management server 6 as well as the port number 44, the local IP address 45, the local port number 46, and the external IP address 47 of the router 2 as a global IP address (sq3). In the management server 6, these data are registered in the server management table. It is also possible that the external IP address of the router 2 is not contained in the data to be transmitted by the network camera 3a, and the management server 6 gets the external IP address of the router from the source IP address of the received packet.

Thereafter, when access is made to the management server 6 from the terminal 4 (sq4), the management server 6 makes a server specification and authentication request (sq5), and the terminal 4 specifies a network camera, inputs authentication data, and transmits it as notification of server specification and authentication data (sq6). Even when the terminal 4 makes access with an ID unique to the network camera 3a, 3b, or 3c, the management server 6 replies a web page provided with a link to the global IP address (hereinafter, referred to as an external IP address) to the terminal 4.

Hereinafter, the processes until the terminal is connected to a target network camera 3a, 3b, or 3c through a web page transmitted to the terminal 4 from the management server 6 by accessing the management server 6 through the Internet 1 are described.

There are three types of web pages to be transmitted to the terminal 4 from the management server 6 as shown in FIG. 6(a), FIG. 6(b), and FIG. 6(c). First, when the terminal 4 accesses the management server 6, connection can be made by using a domain name of the management server 6 such as http://www.miemasu.net/.

FIG. 6(a) is an explanatory view of a network camera specification and authentication web page to be transmitted by the management server of Embodiment 1 of the invention, FIG. 6(b) is an explanatory view of a network camera list specification web page to be transmitted by the management server of Embodiment 1 of the invention, and FIG. 6(c) is an explanatory view of a network camera individual specification web page to be transmitted by the management server of Embodiment 1 of the invention, On the network camera specification and authentication web page shown in FIG. 6(a), the reference numeral 51 denotes a camera ID enter box, 52 denotes an access ID enter box, and 53 denotes a password enter box, and network camera specification and authentication are performed by using these. The reference numeral 54 denotes a list request button for requesting a network camera list specification web page described below, and 55 denotes a send button. When a camera ID (for example, a MAC address), an access ID, and a password are inputted and the send button 55 is depressed, network camera specification and authentication are performed.

On the network camera list specification web page shown in FIG. 6(b), the reference numeral 56 denotes a list in which host names of the network cameras are linked to URLs. This network camera list specification web page is for linkage to a URL "http//:miemasu.net/camera001/" by selecting, for example, the "camera I" from the displayed list of the host names "camera 1" through "camera 3" of the network cameras 3a, 3b, and 3c and simultaneous authentication by an access ID and a password. In FIG. 6(b), when the "camera 1" is clicked, a web page in which "miemasu.net/camera001/" has been entered by default in the camera ID enter box 51 of FIG. 6(a) is transmitted from the management server 6, and then authentication is performed. At this point, it is also possible that a web page without the camera ID enter box 51 is transmitted.

On the network camera individual specification web page shown in FIG. 6(c), the reference numeral 57 denotes a URL input box in which the URL of the network camera to be accessed is inputted, and 58 denotes a settlement button. As a URL, "http//:miemasu.net/camera001/" is inputted and the settlement button 58 is depressed, whereby as in the case of FIG. 6(b), a web page in which "miemasu.net/camera001/" has been entered by default in the camera ID enter box 51 of the network camera specification and authentication web page is transmitted from the management server 6, and authentication is performed by an access ID and a password. It is also possible that a web page without the camera ID enter box 51 is transmitted.

Another manner of connection from the terminal 4 to the network cameras 3a, 3b, and 3c is described below.

(1) Access by Grouping These

When "http://www.miemasu.net/camera001/" is specified, the terminal 4 is connected to the management server 6 having a domain name of "miemasu.net" with a TCP port number 80, and notifies "camera001" by the GET method. The management server 6 retrieves a network camera having the ID of camera001 from the database, and when there are a plurality of network cameras having the ID, an HTML page for displaying in the form of FIG. 6(b) is transmitted, and the terminal 4 makes connection by click-selection of an arbitrary network camera. When only one corresponding network camera exists, an HTML page to be redirected to the corresponding network camera is transmitted, whereby the terminal is connected to the network camera. For security, a user authentication procedure (password confirmation) may be taken before displaying.

(2) Access by Using an Exclusive Domain

Furthermore, it is also possible that specification is performed by http://camera001.miemasu.net/. When many network cameras are management targets as in the case of large-scale customers, an exclusive management server 6 is set, and a domain name is assigned thereto. This becomes possible by acquiring an official domain or using the DDNS service. When the terminal 4 is connected by "http://camera001.miemasu.net/," it is connected to a management server 6 having a domain name of "camera001,miemasu.net" with a TCP port number 80, and when a plurality of network cameras exist on the database, the management server 6 transmits an HTML page for displaying in the form of FIG. 6(b), and when only one corresponding network camera exists, an HTML page to be redirected to the corresponding network camera is transmitted, whereby the terminal is connected to the network camera. For security, a user authentication procedure (password confirmation) may be taken before displaying.

(3) Access by Using an Exclusive Domain and a Unique ID

Furthermore, specification as "http://camera001.miemasu.net/35178913/" is also possible. The terminal 4 is connected to the management server 6 having a domain name "camera001.miemasu.net," and notifies "35178913" by the GET method. Herein, "35178913" is the access ID 42 in FIG. 4. A user can change this ID to an arbitrary value by using a user interface provided by the access destination database server 6, and can change it to an arbitrary value by using a user interface of the network camera. The notified management server 6 retrieves a network camera having the ID "35178913" from the database, and when a plurality of corresponding network cameras exist, the management server transmits an HTML page for displaying in the form of FIG. 6(b), and the terminal 4 click-selects an arbitrary network camera to make connection. When the number of corresponding cameras is only one, the terminal makes connection to the network camera by transmitting an HTML page for redirecting to the corresponding network camera. For security, a user authentication procedure (password confirmation) may be taken before displaying.

In sq6, when the server specification and authentication data notification is transmitted, the management server 6 takes data of an access ID 42 and a password 43 out of the management table storage device 25b, and when the data matches the authentication data, the management server 6 transmits a transfer web page (sq7). The transfer web page is provided with a link to the URL of the destination network camera, and the terminal 4 automatically accesses the network camera 3a as the link destination (sq8). The network camera 3a transmits a control screen web page accordingly (sq9), and can acquire an image from the network camera 3a by inputting into the web page.

Thus, by inquiring to the management server 6 for the URL of the network camera 3a, 3b, or 3c, the terminal 4 side can access the network camera 3a, 3b, or 3c even if it does not know the port number of the network camera 3a, 3b, or 3c. In the description given above, the management server 6 performs authentication, however, it is also possible that the management server 6 only transmits the URL of the network camera 3a, 3b, or 3c, and authentication is performed by the network camera 3a, 3b, or 3c.

(Embodiment 2)

The network cameras, the management server on the Internet, and the router in Embodiment 2 of the invention are described. Even in Embodiment 2, the router 2 has a WAN (Wide Area Network) interface connectable to the Internet 1, and has a plurality of LAN side ports and performs routing for each subordinate IP device, and further has a UPnP function for dynamically setting of port forwarding according to the UPnP standards. The network cameras (IP devices of the invention) 3a, 3b, and 3c are provided with DHCP and UPnP functions for delivering images by protocol TCP/IP. The management server 6 is also provided with a DDNS (Dynamic DNS) function for replying the global IP addresses (hereinafter, referred to as WAN side IP addresses) of the network cameras 3a, 3b, and 3c. When domain names are provided and registered for the network cameras 3a, 3b, and 3c, by accessing with the domain name, connection to each network camera 3a, 3b, or 3c can be made without being conscious of the global IP addresses.

In Embodiment 2, the network cameras 3a, 3b, and 3c are described as IP devices, however, as a matter of course, other devices can be used instead as long as they are computer devices provided with DHCP and UPnP functions that can make communications by protocol TCP/IP.

Figure 7:
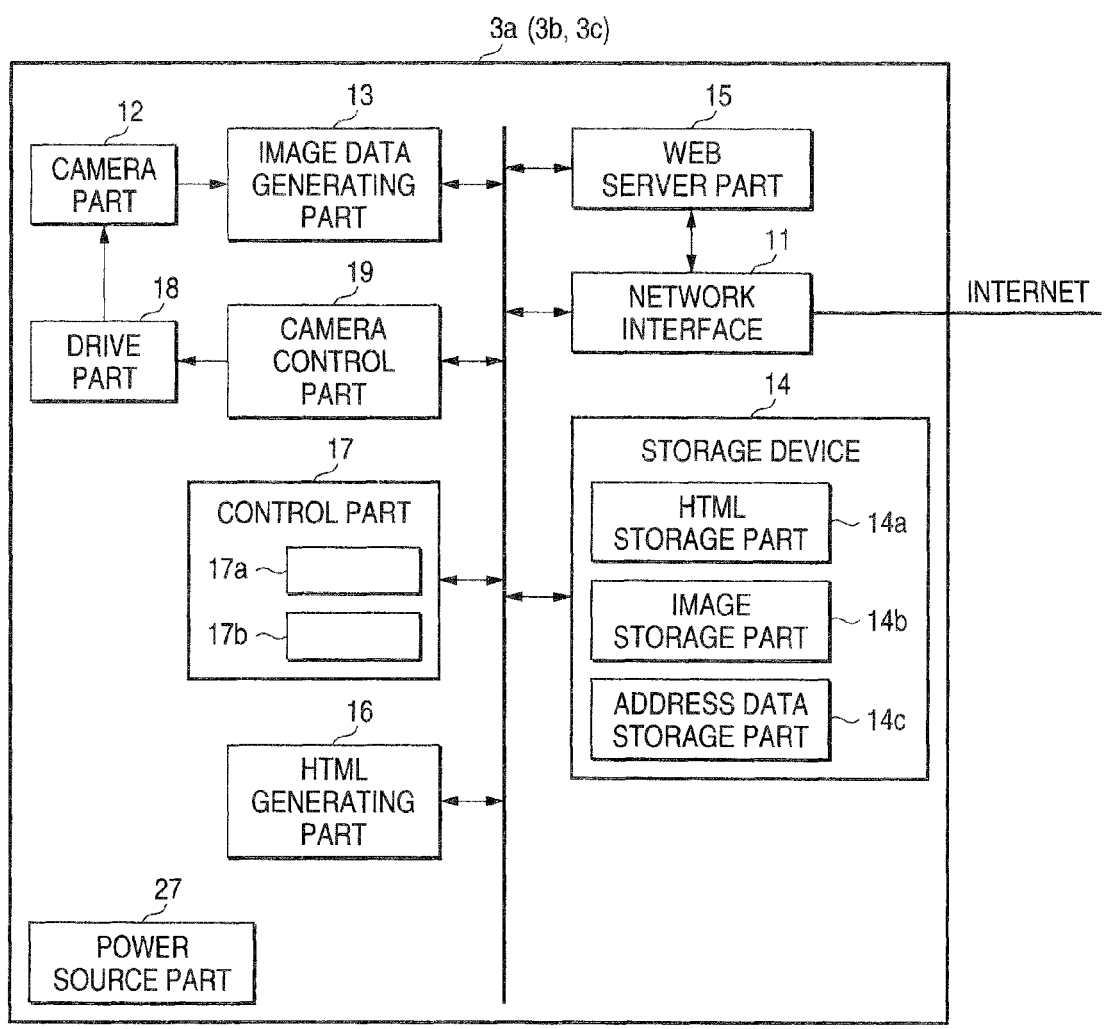
FIG. 7 is a function block diagram of a network camera in Embodiment 2 of the invention.
Figure 8:
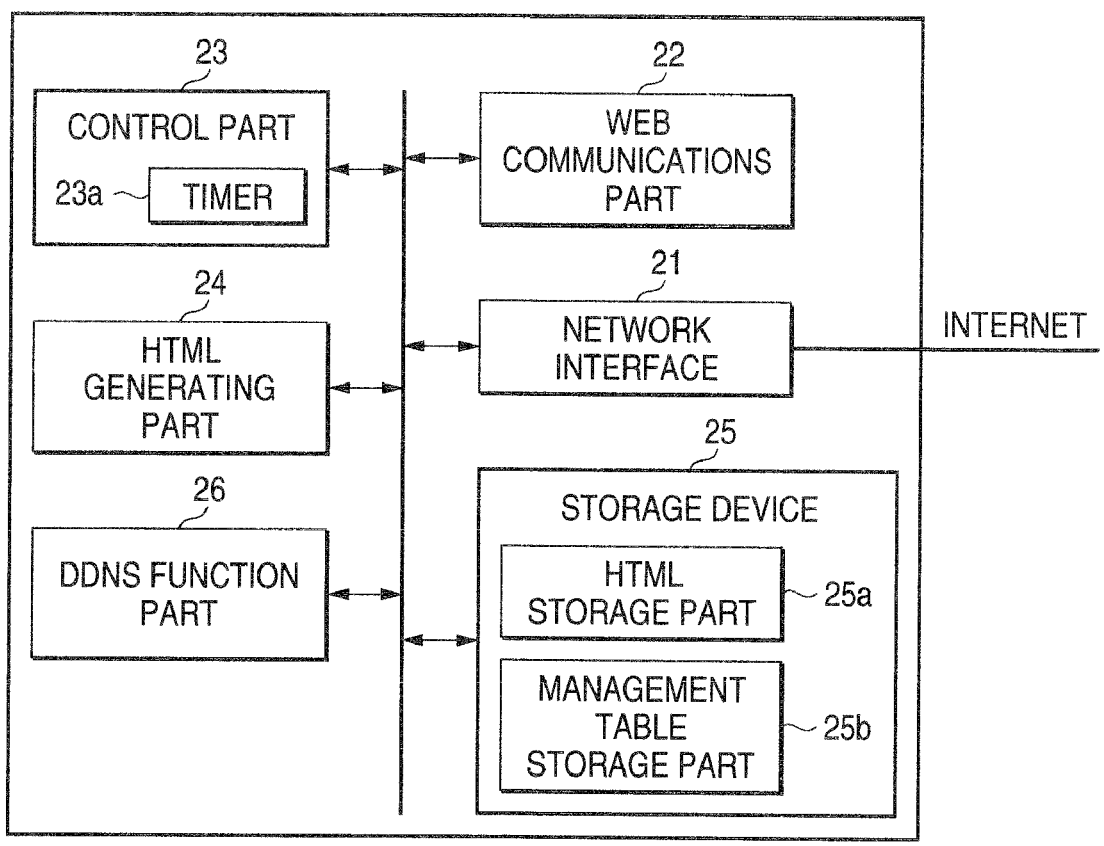
FIG. 8 is a construction diagram of a management server in Embodiment 2 of the invention.
Figure 10:
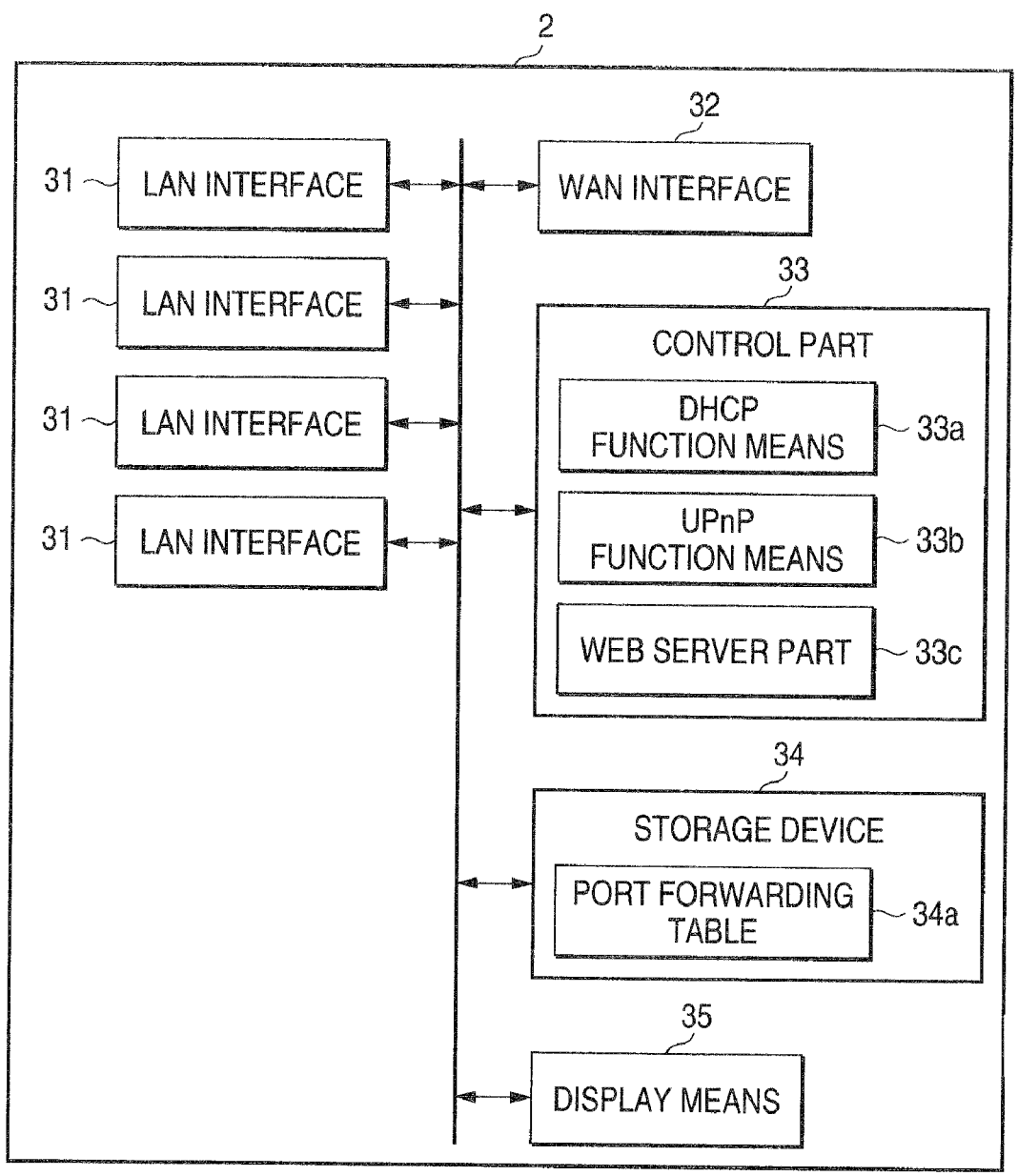
FIG. 10 is a construction diagram of a router in Embodiment 2 of the invention.

FIG. 1 used for description of Embodiment 2 is referred to as the construction diagram of the network system of this embodiment, and parts different from Embodiment 2 are described hereinafter. FIG. 7 is a function block diagram of the network camera in Embodiment 2 of the invention, FIG. 8 is a construction diagram of the management server in Embodiment 2 of the invention, FIG. 9 is a composition diagram of a management table of the management server in Embodiment 2 of the invention, FIG. 10 is a construction diagram of the router in Embodiment 2 of the invention, and FIG. 11 is an explanatory view of setting and image request sequences among the network camera, the management server, and the terminal.

In this Embodiment 2, the computer device 65 placed under the router 2 is connected within a LAN and assists network setting of the network cameras 3a, 3b, and 3c. The router 2 has a DHCP (Dynamic Host Configuration Protocol) server function for assigning, among predetermined local IP addresses (hereinafter, referred to as IP addresses), IP addresses to the IP devices within the LAN, that is, the network cameras 3a, 3b, and 3c and the computer device 65 as well as the above-mentioned UPnP function.

Then, a series of sequences for operations of automatic setting, connection check, image confirmation, and image browsing in normal conditions to be performed among the network cameras 3a, 3b, and 3c, the router 2, the management server 6, and the terminal 4 of this Embodiment 2 are described. Among these sequences, (B) the Internet connection check sequence is additionally described later. FIG. 11 shows sequences among the network camera, the management server, and the terminal. As shown in FIG. 11, sq1 through sq4 are (A) setting sequences, and subsequent sequences sq5 through sq9 are (B) Internet connection check sequences. Furthermore, sq10 and sq11 are (C) confirmation sequences, and Sq12 is (D) a domain name setting sequence, and sq13 through sq15 are (E) image browsing sequences. sq00 is (F) an update sequence.

Figure 11:
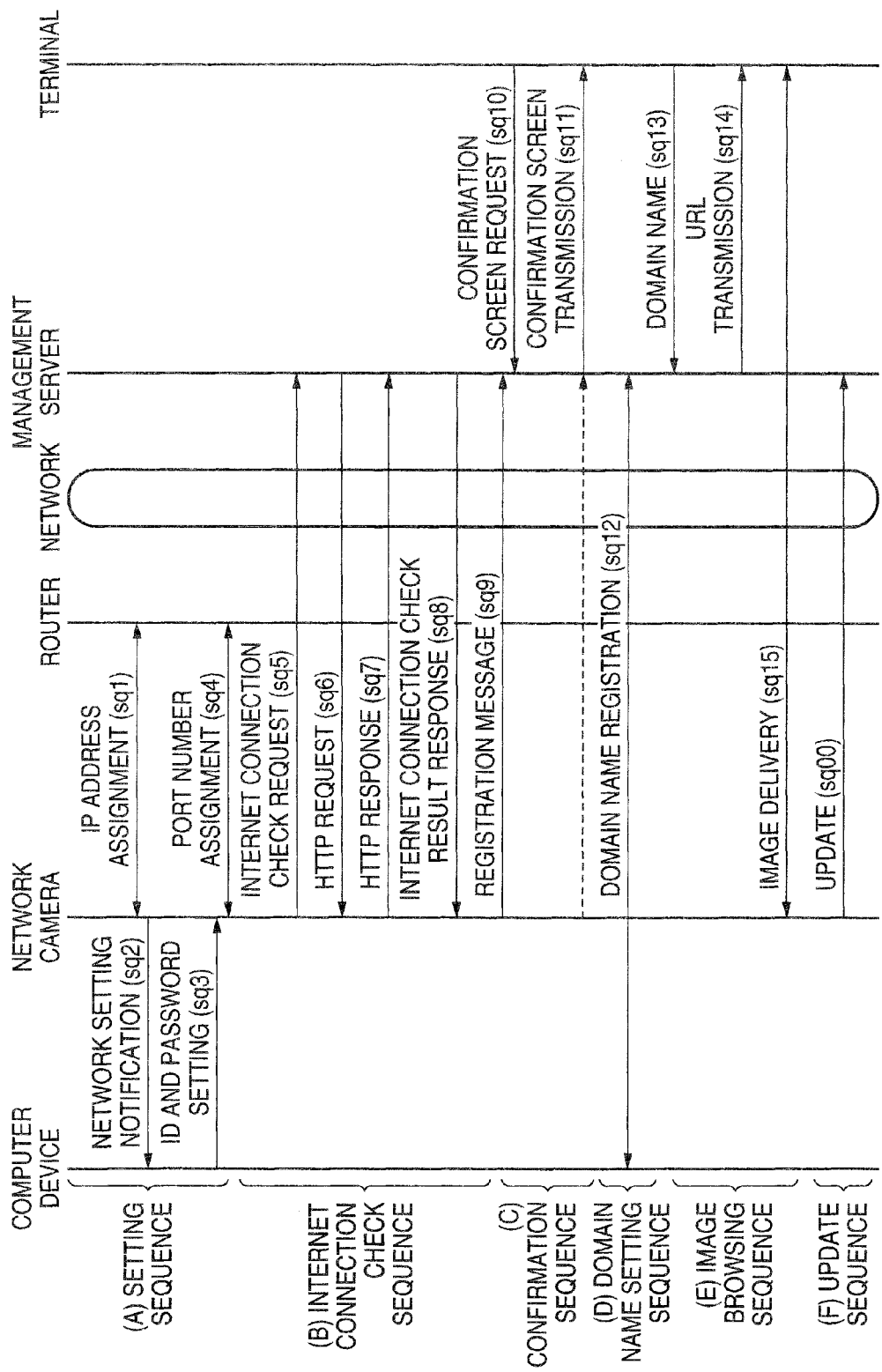
FIG. 11 is an explanatory view of setting and image request sequences among a network camera, the management server, and a terminal in Embodiment 2 of the invention.

First, the (A) setting sequence shown in FIG. 11 is executed. When the network cameras 3a, 3b, and 3c is connected to a LAN or the power sources thereof are turned ON, the network cameras 3a, 3b, and 3c request the router 2 for IP addresses, and the router 2 assigns IP addresses (sq1). The network cameras 3a, 3b, and 3c transmit network setting notification to the computer device 65 (sq2). The computer device 65 confirms user's intention of connection to the Internet, and sets access IDs and passwords for the network cameras 3a, 3b, and 3c (sq3). Next, the network cameras 3a, 3b, and 3c make a request for port assignment to the router 2 by the UPnP function. In this request, MAC addresses, IP addresses, and port numbers of the network cameras 3 are contained, and the router 2 sets the port numbers in a port forwarding table 34a described later as well as the MAC addresses and IP addresses (sq4).

Next, the (B) Internet connection check sequence is executed. When an Internet connection check request is transmitted to the management server 6 from the network camera 3a, 3b, or 3c as well as URL data for access check (sq5), the management server 6 that has received this request transmits an HTTP request in a session different from the sq5 to the access check URL of the network camera 3a, 3b, or 3c (sq6). The router 2 performs routing of this HTTP request to the network camera 3a, 3b, or 3c specified according to the settings of the port forwarding table 34a. In response to this HTTP request, the network camera 3a, 3b, or 3c transmits an HTTP response composed of a status code 200 of OK (hereinafter, referred to as 200OK) as an affirmative response and MAC address data as a reply for the session of sq6 (sq7). When settings of the port forwarding table 34a by the router 2 are not correct, this HTTP request is not transmitted to the specified network camera 3a, 3b, or 3c from the router 2, and no response is made. The router 2 that has received 200OK transmits a response of results of Internet connection check to the network camera 3a, 3b, or 3c (sq8).

The results response to the Internet connection check notifies each response data, and (a) data of an affirmative response being made meaning success of connection, (b) data of a negative response being made meaning connection failure, and (c) data of no response being made meaning connection failure are notified. When this response contains data meaning an affirmative response, the network camera 3a, 3b, or 3c transmits a registration message (signal) meaning that the set MAC address, IP address, and port number are to be settled (sq9). On the other hand, in the case where a negative response is received or no response is received, the results of the Internet connection check which only notify data of a negative response received or data of no response received are transmitted to the network camera 3a, 3b, or 3c, and by notifying this, connection of the router 2 to the Internet 1 is urged again or port forwarding setting, etc., is manually urged.

When the connection of (B) is successfully made, the (C) confirmation sequence is executed. When access is made to the URL storing the confirmation screen page data of the management server 6 from the terminal 4 (sq10), confirmation screen page data described in HTML, etc., is readout and transmitted (sq11). At this point, the URL to be accessed contains a file name showing the confirmation screen page data, and as the file name, a file name obtained by encoding the MAC address is employed. In the management server 6, this encoded MAC address is decoded, and an IP address and port number of the network camera are readout from this MAC address. Furthermore, in order to make it possible to readout a sample image stored in the network camera 3a, 3b, or 3c, the management server 6 generates confirmation screen page data linked to a directory of this image and transmits this data to the terminal 4. On the terminal 4, this sample image is browsed by displaying the confirmation screen page. When the confirmation sequence is executed for several days, it is possible that imaging is carried out by the network camera 3a, 3b, or 3c and the sample image is updated.

It is preferable that encoded MAC addresses as above-described are entered on documents attached by the manufacturer to the network cameras 3a, 3b, and 3c as well as the URL, packaged, and sold. They can be commonly used as the ID numbers of the access IDs 42 described later. For example, when access is made by assuming a file name obtained by encoding a MAC address "00223344D732" as "FFFF35178913" and the URL as "http://camera.c.net/FFFF35178913/," the management server 6 decodes "FFFF35178913" to the MAC address "00223344D732," and a corresponding IP address and a port number of the network camera 3a, 3b, or 3c can be readout. Herein, the code up to the URL "http://camera.c.net" is commonly determined, and a user accesses by attaching the encoded file name "FFFF35178913" unique to the network camera, whereby the management server 6 can specify the network camera 3a, 3b, or 3c.

Furthermore, the (D) domain name setting sequence can also be executed. The management server 6 provides domain names for the network cameras 3a, 3b, and 3c and registers these, and the computer device 65 is notified of the domain names from the network cameras 3a, 3b, and 3c. The management server 6 registers by relating the MAC addresses and IP addresses to the domain names. The domain names completely registered are transmitted from the computer device 65 to the terminal 4 (sq12). In this sq12, other procedures can be performed simultaneously. By this registration, the DDNS function becomes executable in the management server 6. Therefore, the subsequent (C) confirmation sequence can be executed by the domain names.

In this state, when access is made by using the domain name, the (E) image browsing sequence becomes executable. Namely, when access is made from the terminal 4 by using the domain name (sq13), the management server 6 transmits a URL described by using the WAN side IP address and the WAN side port number of the network camera 3a, 3b, or 3c (sq14), and when the terminal 4 accesses the network camera 3a, 3b, or 3c by this URL, an image is delivered (sq15). The (F) update sequence is for periodically updating the WAN side IP addresses and the WAN side port numbers of the network cameras 3a, 3b, and 3c after sending a registration message in sq9. The management server 6 is notified of the details of updating at predetermined time intervals as well as the MAC addresses. (sq00).

Then, the internal construction of the network cameras 3a, 3b, and 3c and the management server 6 which execute the above-mentioned sequences and the internal construction of the router 2 which executes port forwarding setting are described with reference to FIG. 7, FIG. 8, and FIG. 10. First, the network cameras 3a, 3b, and 3c are described. In FIG. 7, the interface 11 conforms to the IEEE802.3 standards, which transmits a request from a communications means such as a browser of the terminal 4 sent through the router 2 to the network camera 3a, 3b, or 3c, and transmits display data (hereinafter, referred to as page data) described in a markup language such as HTML for displaying a web page from the network camera 3a, 3b, or 3c to the Internet 1 through the router 2. The reference numeral 12 denotes a camera part, and the reference numeral 13 denotes an image data generating part which processes video signals from a CCD or CMOS image pickup device provided in the camera part 12 and compresses the signals into a compression format such as the JPEG or MPEG format.

The storage device 14 memorizes control programs and various data, the HTML storage device 14a stores page data describing display instructions and link data in HTML, the image storage device 14b stores image data compressed by the image data generating part 13, and the address data storage part 14c stores assigned port data, MAC addresses, IP addresses, and the address of the management server 6.

The web server part 15 communicates with the Internet 1 by the protocol TCP/IP, and the HTML generating part 16 extracts page data from the storage device 14 for a communications means when the web server part 15 is accessed from the communications means of the terminal 4, further generates page data and transmits the page data from the web server part 15. In Embodiment 2, in the (B) Internet connection check sequence, an HTTP request is transmitted from the management server 6, and in response to this, the HTML generating part 16 reads-out page data of the access destination, generates an HTTP response describing the MAC address, and transmits it from the web server part 15.

The control part 17 is constructed as a function realizing means for performing functions by reading control programs into the central processing unit (CPU). The port management means 17a executes the UPnP function and manages port data, the DHCP management means 17b transmits a DHCP discover packet and is assigned with an IP address from a DHCP server or the like. The DHCP management means 17b and the port management means 17a request the router 2 having the DHCP function and the UPnP function to assign an IP address and a port number, and when an IP address and a port number are assigned, these are registered in the address data storage part 14c.

The DHCP server not always have to be provided in the router 2, and the DHCP server may be disposed within a LAN which can receive a DHCP discover packet transmitted from the DHCP management means 17b. Thereafter, when an Internet connection check is made and connection is successfully made, the control part 17 notifies the management server 6 of the MAC address, the IP address, and the port number through the web server part 15, and periodically updates the contents of this registration.

The drive part 18 performs operations such as panning and tilting of the camera part 12, the camera control part 19 drives the drive part 18 and controls the camera part. The control part 17 processes a request from a communications means and generates page data by operating the HTML generating part 16, extracts image data to be transmitted to the communications means from the storage device, and operates the camera control part 19 upon specifying an imaging mode.

Next, the internal construction of the management server 6 is described with reference to FIG. 8. In FIG. 8, the reference numeral 21 denotes a network interface to the Internet 1, 22 denotes a web communications part which communicates with the Internet 1 by the protocol TCP/IP, and 23 denotes a control part. The control part 23 is also constructed as the above-mentioned function realizing means. The reference numeral 23a denotes a timer (timekeeping means of the invention) for judging no response in the case of timeout when the Internet connection check is made. When the Internet connection is successfully made, the success is judged by receiving an HTTP response of 200OK, and an HTTP response is also received in the case of a negative response, however, such judgement cannot be made in the case of no response, so that no response and connection failure are judged by timeout. The HTML generating part 24 extracts page data composed by HTML, etc., from the storage device 14 for a communications means when access is made from the communications means of the terminal 4, and further generates page data and transmits it from the web communications part 22.

The storage device 25 memorizes control programs and various data, the HTML storage device 25a stores a plurality of pieces of page data for authentication and network camera access described in HTML, etc., and the management table storage device 25b stores a management table containing port numbers, MAC addresses, IP addresses, access IDs, and passwords assigned to the network cameras 3a, 3b, and 3c, and domain names of the network cameras. The management table storage device 25b also stores the WAN side IP address of the router 2.

The DDNS function part 26 extracts address data (the MAC address, the IP address, the port number, and the WAN side IP address of the router 2) from the management table when inquiry is made with a domain name and a port number, and notifies a URL.

An example of this management table is shown in FIG. 9. The reference numeral 41 denotes an ID of the IP device (the network camera 3a, 3b, or 3c in this embodiment) as an access target, and is, for example, the MAC address "00:22:33:44: D7:32" of this device. The reference numeral 42 denotes an access ID, and 43 denotes a password. When a user buys the product, an ID number such as "35178913" is entered on a document attached by the manufacturer, and the user who is authenticated with this ID number is allowed to access, and at the time of shipment, a default password is also set and is changed to, for example, "3zD45E" by the user side after success of authentication. Data for authentication is inputted from the computer device 65 (see sq3 of FIG. 11).

The reference numeral 44 denotes a WAN side port number assigned by a UPnP-enabled router 2, 45 denotes an IP address of the network camera 3a, 3b, or 3c, 46 denotes a LAN side port number, 47 denotes a WAN side IP address of the router 2, and 48 denotes a domain name. For the MAC address 41, the IP address, and the port number, update notification is periodically sent at intervals of approximately 10 minutes from the network camera 3a, 3b, or 3c, and the data are updated. For making management easy, operation by making the WAN side port number identical to the LAN side port number is possible.

Next, the internal construction of the router 2 is described based on FIG. 10. In FIG. 10, the LAN interface 31 is provided with a port for the LAN side, and the WAN interface 32 is provided with a port for the Internet 1 side. The control part 33 is constructed as the above-mentioned function realizing means. The DHCP function means 33a assigns an IP address in response to an IP address request made from a client, the UPnP function means 33b dynamically assigns a port number for port forwarding according to the UPnP standards, and the web server part 33c is for communications by TCP/IP. The reference numeral 34 denotes a storage part, 34a denotes a port forwarding table provided in the storage part 34, and 35 denotes a display means for displaying on an LCD or the like.

The router 2 is thus constructed, so that when the network cameras 3a, 3b, and 3c are connected to the LAN interface 31 or the power sources thereof are turned ON, the DHCP management means 17b of each network camera transmits a packet for requesting an IP address, and the DHCP function means 33a that has received this packet assigns IP addresses to the network cameras 3a, 3b, and 3c that have transmitted the packet, and registers the IP addresses in the port forwarding table 34a.

When setting of the IP address is finished, each network camera requests the UPnP function means 33b to assign ports by the UPnP function, and the router 2 registers assignable port numbers in the port forwarding table 34a, and then ends setting of the router. For example, when "8080" is assigned, by the port forwarding function of the router 2, by using the WAN side IP address "60.1.2.3" of the router 2 and the WAN side port number "8080," access can be made to the network camera 3a by means of "http://60.1.2.3:8080/" from the Internet 1 side. Then, by registering a domain name of the management server 6 as this port number in the address data storage part 14c of the management server 6, access can be made by the domain name.

During the Internet connection check sequence, no domain name is registered, so that the control part 17 of the network camera 3a transmits a packet of an Internet connection check request to the management server 6 by using the WAN side IP address "60.1.2.2" of the management server 6 and a predetermined HTTP port number "60001" for this service. On the other hand, in the image browsing sequence in normal use for requesting image delivery, when the terminal 4 of the Internet 1 accesses by the URL "http://camera001.c.net/" by using, for example, a domain name "camera001" and the HTTP port number "8080," the management server 6 converts it into "http://60.1.2.3:8080/" by referring to the management table by the DDNS function part 26, and notifies the terminal 4 of this. The terminal 4 accesses the router 2 by this WAN side IP address, and the router 2 performs port forwarding by converting the address into "http://192.168.0.2:8080," and it is received by the network camera 3a.

Figure 12:
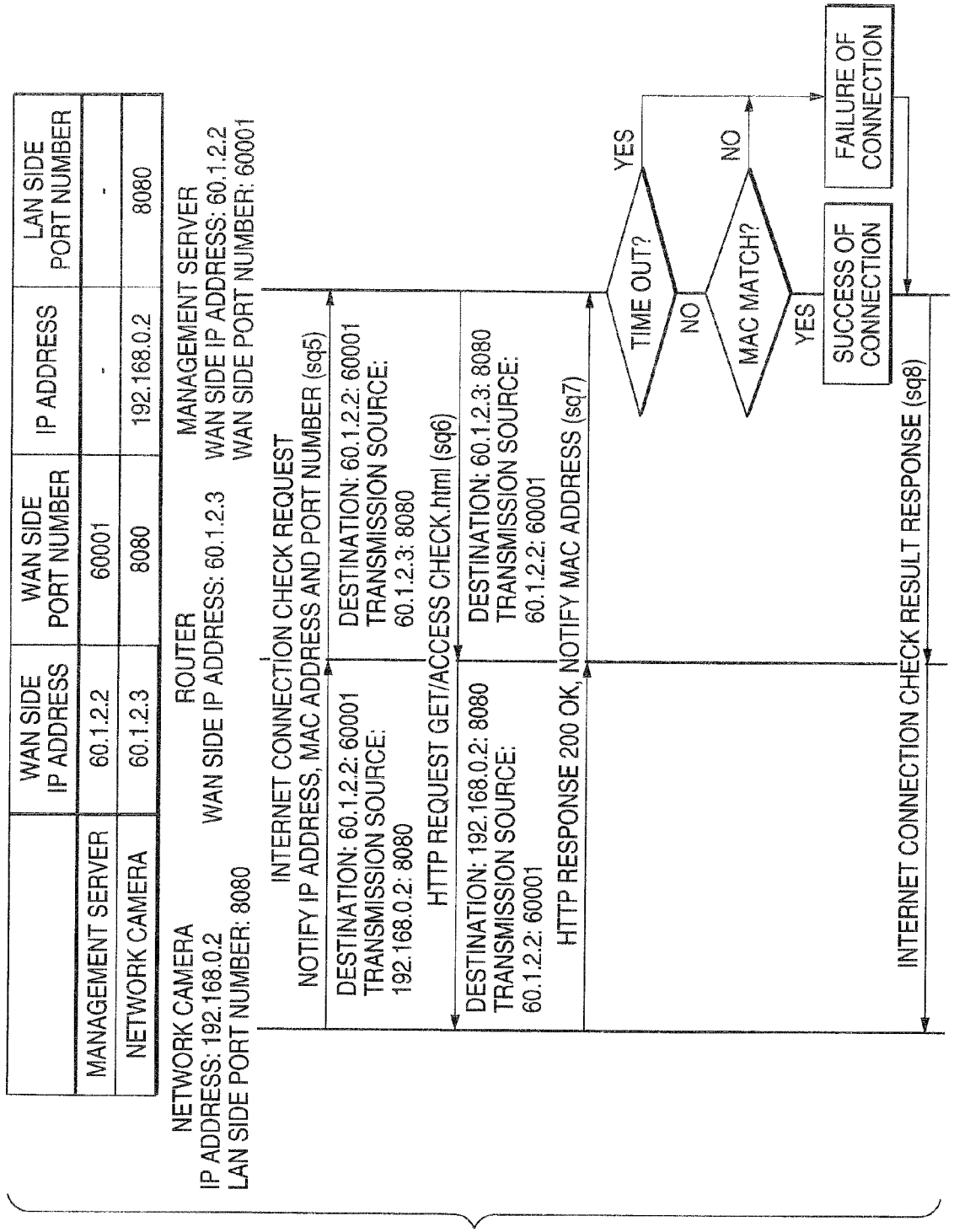
FIG. 12 is a detailed sequence chart for Internet connection check in Embodiment 2 of the invention.

The (B) Internet connection check sequence of Embodiment 2 is described in greater detail. FIG. 12 is a detailed sequence chart of the Internet connection check in Embodiment 2 of the invention. sq5 through sq8 are sequence numbers shown in FIG. 11, and the same numbers are also used in FIG. 12.

As shown in FIG. 12, when the network camera 3a is connected to the router 2, the control part 17 of the network camera 3a makes an Internet connection check request by the protocol HTTP in "sq5." The IP address of the network camera 3a is "192.168.0.2," the LAN side port number is "8080," and the WAN side IP address of the management server 6 is "60.1.2.2," and the HTTP port number is "60001." The WAN side IP address of the router 2 is "60.1.2.3." Therefore, as the Internet connection check request, the network camera 3a composes a TCP packet by, for example, a destination IP address "60.1.2.2:60001" and a source IP address "192.168.0.2:8080," and transmits it by containing the MAC address 41 that is for authentication and simultaneously indicates that connection has been reliably made in the data area. At the router 2, conversion into the WAN side IP address is performed by using the port forwarding table 34*a*, and an IP packet composed of the IP address "60.1.2.2:60001" and the source IP address "60.1.2.3:8080" is transmitted.

In response to this, at the management server 6, the control part 23 extracts the WAN side IP address, the port number, and the MAC address 41 of the source and stores these in the management table storage device 25*b*, and transmits an HTTP request for accessing the URL "Access Check.html" of the network camera 3*a* by the GET method in "sq6." The HTTP request is transmitted with the destination IP address "60.1.2.3:8080" and the source IP address "60.1,2.2:60001," and at the router 2, these are converted into a destination IP address "192.138.0.2.:8080" and a source IP address "60.1.2.2:60001" and then the request is received by the network camera 3*a*.

When IP address setting and port forwarding setting are properly performed, the management server 6 can correctly access the access check file (exclusive file of the invention, for example, the file name "Access Check.html" in FIG. 12) of the network camera 3*a*, and in "sq7," the network camera 3*a* notifies the management server 6 of 200OK and the MAC address as an HTTP response. Most of the other cases mean that port forwarding setting has a problem.

In order to judge no HTT response (no response), the management server 6 counts the time by the timer 23*a* since the HTTP request is transmitted, and when settings are properly performed, an HTTP response is received in time, and the control part 23 extracts the MAC address from the HTTP response. By comparing this MAC address with the MAC address that was transmitted according to an Internet connection check request and stored in the management table storage device 25*b*, and when these match each other, the control part 23 judges that connection to the Internet has been successfully made, and the HTML generating part 24 generates data of an affirmative response being made meaning success of connection. If no MAC address is notified or the MAC addresses do not match each other, it is judged that a negative response is notified instead of 200OK, and the HTML generating part 24 generates data of a negative response being made meaning connection failure. When no response is made, the timer 23*a* times out, whereby judging no HTTP response made, and the HTML generating part 24 generates data of no response being made meaning connection failure.

In "sq8," as an Internet connection check result response, the web communications part 22 transmits a packet containing data of an affirmative response being made, data of a negative response being made, or data of no response being made. In the case of success, as shown in "sq9" of FIG. 11, a registration message informing settlement of registration of the MAC address, IP address, and the port number set from the network camera 3*a* is transmitted. In the description given above, by informing the MAC addresses, it is confirmed whether or not the MAC addresses match each other, however, this confirmation may be omitted.

Figure 13:
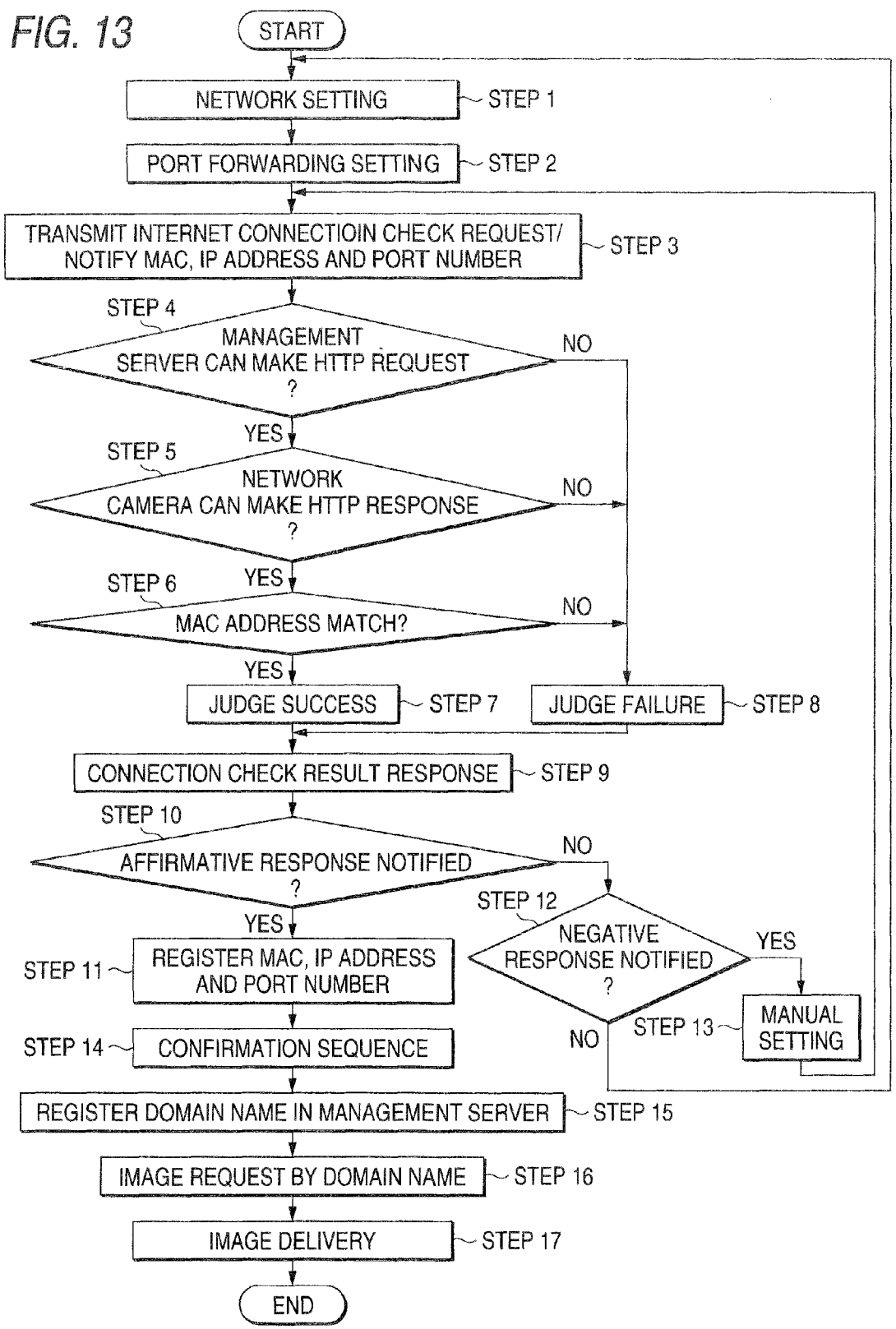
FIG. 13 is a flowchart followed among the network camera, the management server, and the terminal in Embodiment 2 of the invention.

Next, a flowchart of a series of operations for automatic setting, connection check, confirmation, and image browsing in normal conditions to be performed among the network cameras, the management server, and the terminal in Embodiment 2 of the invention is described. FIG. 13 is a flowchart of operations to be performed among the network cameras, the management server, and the terminal in Embodiment 2 of the invention.

In FIG. 13, when the network camera 3*a* is connected to a LAN or the power source thereof is turned ON, the DHCP management means 17*b* of each network camera 3*a* makes a request for an IP address to the DHCP function means 33*a* of the router 2, and the DHCP function means 33*a* assigns an IP address and sets the IP address (step 1). Next, the network camera 3*a* makes a request for assignment of a port to the UPnP function means 33*b* of the router 2 by the port management means 17*a*, and performs port forwarding setting (step 2).

The control part 17 of the network camera 3*a* transmits an Internet connection check request, and simultaneously transmits the MAC address, the IP address, and the port number to the management server 6 (step 3). The control part 23 of the management server 6 that has received these checks whether or not the IP address and the port number of the destination have a problem, and confirms whether or not it is possible to transmit an HTTP request to the network camera 3*a* (step 4).

When it is possible to transmit an HTTP request in step 4, it is judged whether or not it is possible to transmit an HTTP response at the control part 17 of the network camera 3*a* (step 5). When it is not possible to transmit an HTTP request in step 4, the process advances to step 8. When an HTTP response is notified in step 5, the control part 23 of the management server 6 extracts the MAC address notified by the HTTP response, compares it with the MAC address transmitted in step 3, and judges whether or not these MAC addresses match each other (step 6). When an HTTP response is not transmitted in step 5 (in the case of no response), and when the MAC addresses do not match (when a negative response is notified) in step 6, the process advances to step 8.

When the MAC addresses match each other in step 6, the control part 23 judges that connection to the Internet has been successfully made (step 7), and when the MAC addresses do not match each other, connection to the Internet is judged as being failed (step 8). The control part 23 of the management server 6 transmits an Internet connection check result response from the web communications part 22 to the network camera 3*a* by containing data of an affirmative response being made, data of a negative response being made, and data of no response being made in step 7 or 8 in a packet (step 9).

In step 9, in the network camera 3*a*, it is confirmed whether or not notification containing data of an affirmative response being made indicating success of connection as a judgement result has been transmitted (step 10), and when success of connection is notified, the end of automatic setting is judged, and the control part 17 transmits a registration message informing settlement of the MAC address, the IP address, and the port number (step 11). In step 10, when the notified data is not data of an affirmative response being made, it is confirmed whether or not data of a negative response being made has been notified (step 12). In this step 12, when data of a negative response being made is notified, failure of automatic setting is judged, and port forwarding setting is manually made (step 13), and then the process returns to step 3. In step 12, when data of a negative response being made is not notified, that is, when data of no response being made is notified, failure of automatic setting is judged, and the process returns to step 1, the user connects the network camera 3*a* to the router 2 again, or confirms connection of the router 2 to the Internet 1, and repeats operations from turning ON of the power source. Furthermore, it is preferable that the user is informed of the end and failure of automatic setting by means of an informing means (not shown) such as a speaker or an LCD, etc.

After the MAC address, the IP address, and the port number are registered in step 11, the confirmation sequence for receiving a confirmation image by the terminal 4 is performed (step 14). Next, the DDNS function part 26 of the management server 6 registers the domain name "camera001" in the management table storage device 25b by associating it with the MAC address, the IP address, and the port number so that access can be made from the terminal 4 of the Internet 1 by the domain name "camera001" (step 15). Thereafter, when the terminal 4 makes a request for an image to the network camera 3a by using the domain name "camera001" and the MAC address, it is converted into an IP address by the management server 6, and the network camera 3a that has received the IP address delivers an image (step 17).

Thus, the network camera and the management server in Embodiment 2 of the invention are constructed so that IP address setting and port forwarding setting are automatically performed, and furthermore a connection check request is transmitted to the management server, an affirmative response is transmitted when response to the connection request from the management server is possible, and the end of automatic setting is judged from data of an affirmative response being made contained in the connection check result response from the management server, and therefore, the connection to the Internet is automatically checked, so that even a user who has no expertise can set a network camera.
(Embodiment 3)

Figure 14:
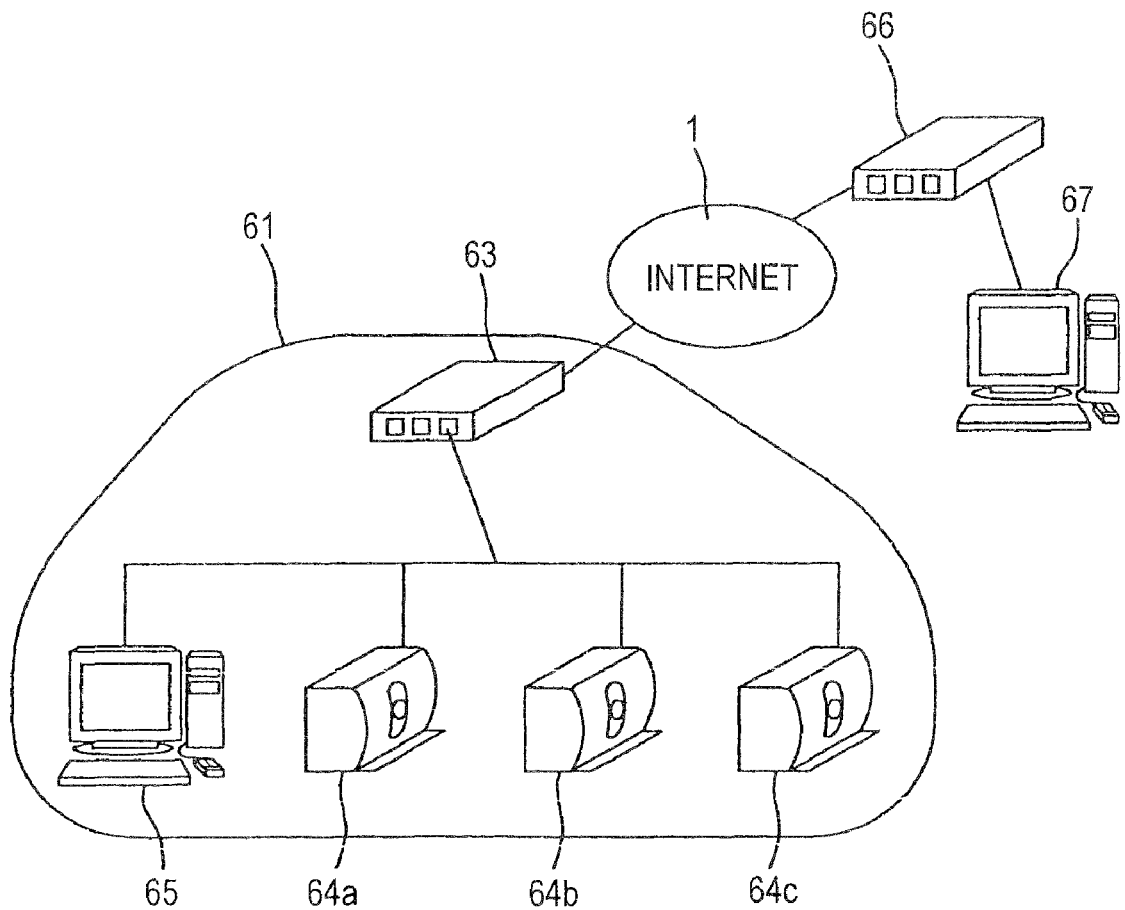
FIG. 14 is a construction diagram of a network system containing network cameras in Embodiment 3 of the invention.
Figure 15:
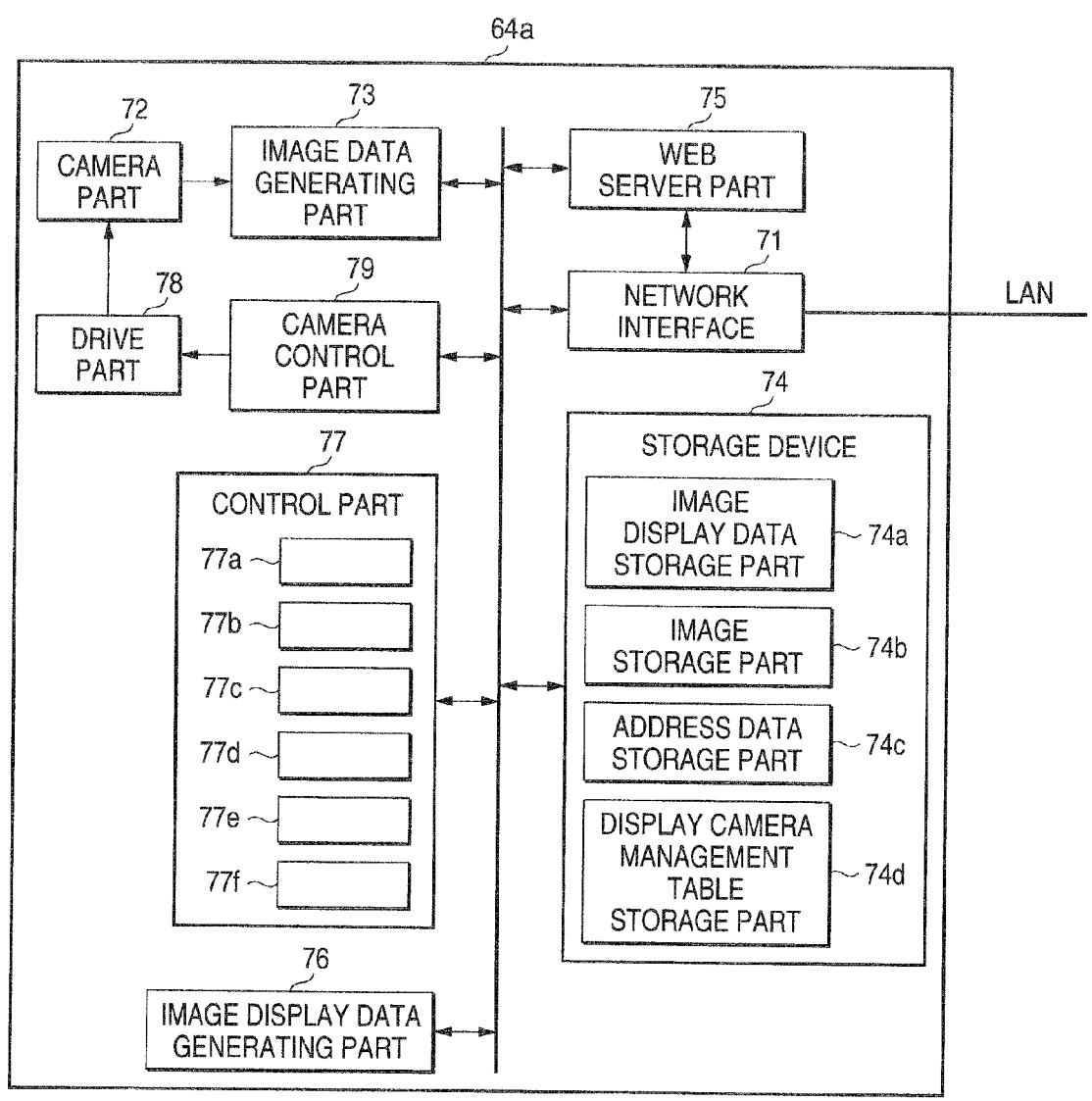
FIG. 15(*a*) is a function block diagram of a network camera in Embodiment 3 of the invention, and FIG. 15(*b*) is an explanatory view of the functional configuration of a program for automatic setting installed in the network camera of FIG. 15(*a*)
Figure 16:
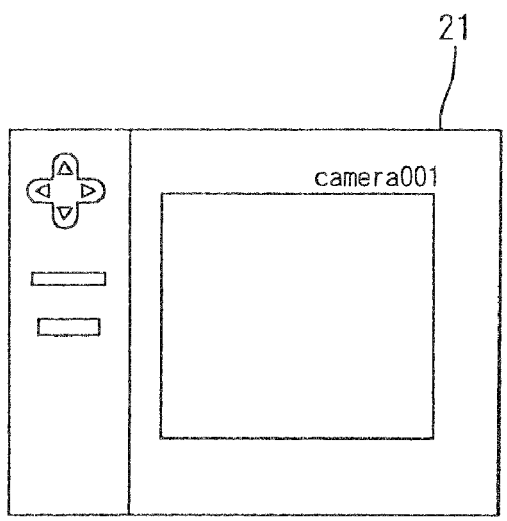
FIG. 16 are explanatory views of portal image display data in Embodiment 3 of the invention.
Figure 16:
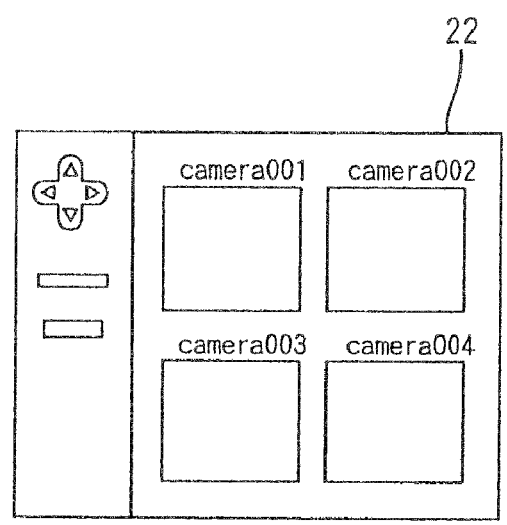
Figure 19:
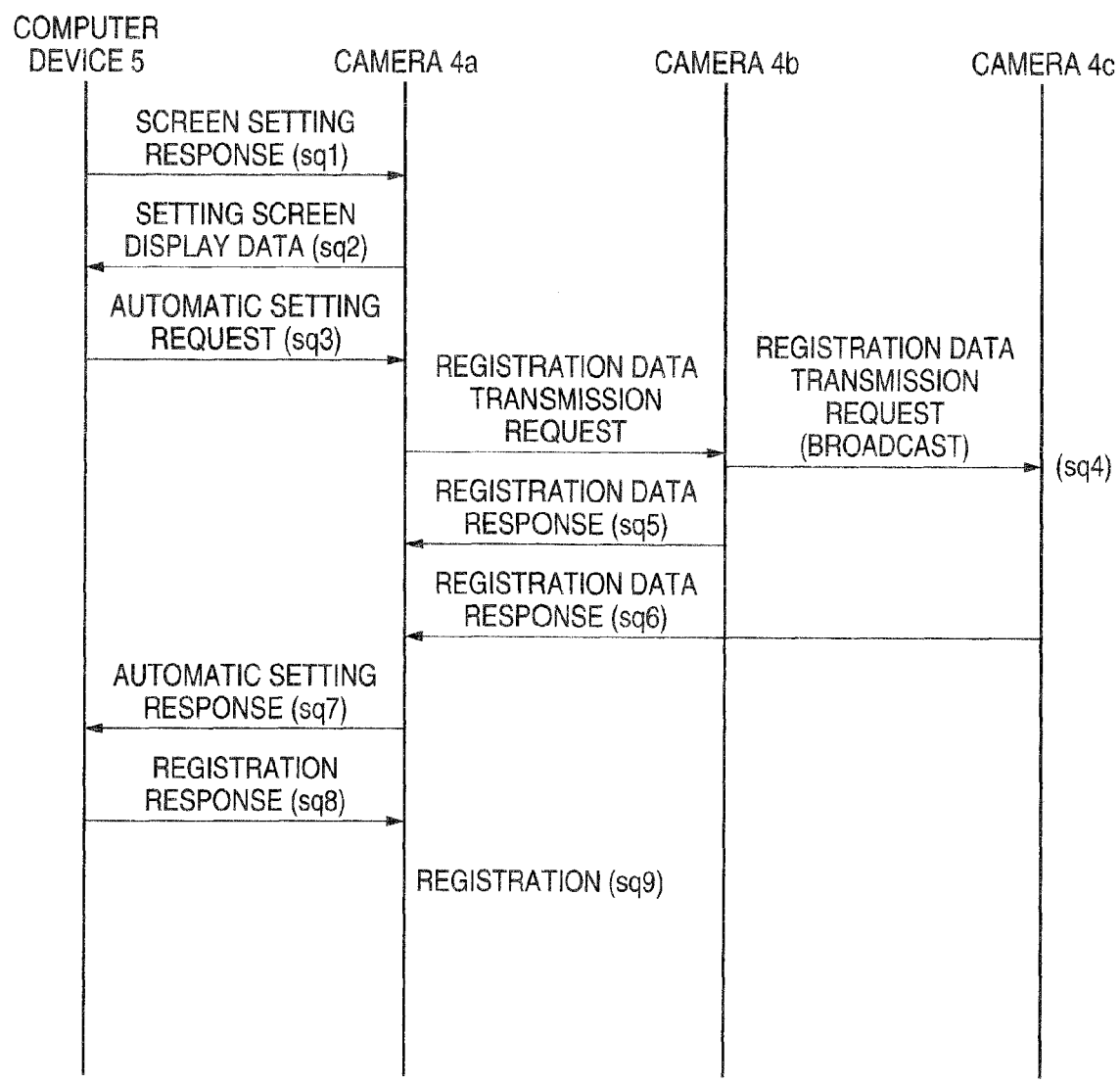
FIG. 19 is an automatic setting sequence chart in Embodiment 3 of the invention.

Hereinafter, an embodiment which makes it possible to display a list of images from a plurality of cameras on a portal screen is described. FIG. 14 is a construction diagram of a network system containing network cameras in Embodiment 3 of the invention, FIG. 15(a) is a functional block diagram of a network camera in Embodiment 3 of the invention, FIG. 15(b) is an explanatory view of the functional configuration of programs for automatic setting to be installed in the network camera of (a), FIG. 16 is an explanatory view of portal screen display data in Embodiment 3 of the invention, FIG. 17(a) is an explanatory view of a setting screen in Embodiment 3 of the invention, FIG. 17(b) is an explanatory view of a display camera registration screen in Embodiment 3 of the invention, FIG. 18 is an explanatory view of a display camera management table, and FIG. 19 is a sequence chart of automatic setting in Embodiment 3 of the invention.

In FIG. 14, the reference numeral 1 denotes the Internet. The reference numeral 61 denotes a local area network (hereinafter, referred to as LAN), and 63 denotes a router provided with a UPnP function which is provided with a plurality of LAN side ports and performs routing for each subordinate IP device, in particular, for dynamic port forwarding setting according to the UPnP standards.

The reference numerals 64a, 64b, and 64c are network cameras provided with DHCP and UPnP functions for delivering images by the protocol TCP/IP. The network of the invention is not limited to the LAN 61, and may contain a network consisting of a wide area network such as the Internet 1, etc., and the LAN 61 according to the position of a terminal that makes access thereto.

The computer device 65 is connected within the LAN to perform management for administration of the network cameras 64a, 64b, and 64c.

The reference numeral 66 denotes a router, and 67 denotes a terminal that can access the network cameras 64a, 64b, and 64c by being connected to the Internet 1.

The computer device 65 and the terminal 67 both correspond to the terminal of the invention. The router 63 of Embodiment 3 is provided with, in addition to the UPnP function, a DHCP (Dynamic Host Configuration Protocol) server function for assigning IP addresses to the IP devices within the LAN, that is, the network cameras 64a, 64b, and 64c and the computer device among predetermined local IP addresses (hereinafter, referred to as IP addresses).

The construction of the network cameras 64a, 64b, and 64c is described hereinafter. In FIG. 15, the reference numeral 71 denotes an interface conforming to the IEEE802.3 standards, which transmits a request from a communications means such as a browser of the terminal 67 to the network cameras 64a, 64b, and 64c, and transmits screen display data described in a markup language such as HTML, etc., for displaying web pages, etc., from the network cameras 64a, 64b, and 64c to the Internet 1.

The camera part 72 has a CCD or CMOS image pickup device, etc., the image data generating part 73 processes video signals from the camera part 72 and compresses these into a compression format such as the JPEG format or the MPEG format.

The storage device 74 memorizes control programs and various data, and the image display data storage part 74a stores screen display data describing display instructions and link data for displaying portal screen display data, setting screen pages (setting screen display data of the invention), and other screens. The screen display data is described in a markup language such as HTML, etc., and Java (registered mark) applet, etc. Not limited to HTML, description in other markup languages such as XML, XTML, etc., is also possible.

The image storage device 74b stores image data compressed by the image data generating part 73, the address data storage part 74c stores port numbers assigned in the port forwarding table of the router 63 according to the UPnP standards, a WAN side IP address of the router 63, and a MAC address, an IP address, and a host name of this device, and the display camera management table storage device 74d stores a display camera management table that records data for displaying a single image or a list of images in the portal screen display data. The above-mentioned screen display data described in the HTML or the like is stored in the screen display data storage part 74a, and image data displaying in this case are stored in the image storage device 7 of each network camera.

The web server part 75 communicates with the network by the protocol TCP/IP or UDP, etc., and the screen display data generating part 76 generates screen display data and extracts the screen display data from the storage device 74 and transmits it when access to the web server part 75 is made from the communications means of the terminal 4. The multi-image screen display data described later is generated by the image display data generating part 76 on the basis of the display camera management table and transmitted.

The reference numeral 77 denotes a control part, and is constructed as a function realizing means which performs functions by reading control programs into the central processing unit (CPU). The port management means 77a performs the UPnP function, stores the WAN side port numbers assigned in the port forwarding table of the router 63 and the WAN side IP address, etc., of the router 63 acquired by a request in the address data storage part 74c and manages these, and the DHCP management means 77b transmits a DHCP discover packet and is assigned with an IP address from a DHCP server or the like. The DHCP management means 77b and the port management means 77a request assignment of WAN side IP addresses and WAN side port numbers to the router 63 provided with the DHCP function and the UPnP function, and they register these in the address data storage part 74c when being assigned. The DHCP server is not necessarily provided in the router 63, and may be disposed within the LAN.

The automatic setting execution means 77c broadcasts a UDP packet into the LAN 61 for automatic setting of images of portal screen display data to be displayed on the computer device 65 when the computer device 65 makes a request for automatic setting to the network camera 4a, and the table registration means 77d creates a display camera management table by extracting registration data from packets replied from the network cameras that have received this packet. By the automatic setting execution means 77c and the table registration means 77d, without manually inputting the IP addresses, port numbers, and host names, these can be registered in the display camera management table only by broadcasting the registration data transmission request.

The data reflection execution means 77e displays data in a template of setting screen display data by the screen display data generating part 76 for reflecting the data on the setting screen when the display camera management table is completed by broadcasting. The screen display data generating part 76 automatically generates screen display data containing the data displayed in the template of the setting screen display data, and the control part 77 registers the generated screen display data in the storage device 74. Thereby, screen display data for a list (access multi-image screen) 22 of its own images or images of other network cameras shown in FIG. 16(b) can be generated and registered.

Like A of FIG. 15(b), the program for automatic setting comprises the automatic setting execution means 77c, the table registration means 77d, and the data reflection execution means 77e, and is installed in the network camera 64a, and it is also possible that the program is installed by communications by using a program of the above-mentioned applet or plug-in. The data reflection execution means 77e functions integrally with the image display data generating part 76 for screen display data generation that reflects the data so as to operate the screen display data generating part 76.

The registration data transmission means 77f executes processing to extract network data registered in the address data storage part 74c. When the registration data transmission means 77f receives a registration data transmission request (network data acquiring request for the invention) for requesting an IP address, a port number, a MAC address, and a host name via the network interface 11, the registration data transmission means 77f extracts these data registered in the address data storage part 74c and transmits these as a registration data response (network data acquiring response of the invention). The automatic setting execution means 77c, the table registration means 77d, the data reflection execution means 77e, and the registration data transmission means 77f are all function realizing means composed by programs by using the CPU as hardware.

The drive part 78 is a motor or the like for operations such as panning and tilting of the camera part 72, the camera control part 79 drives the drive part 78. The control part 77 processes a request from a communications means and generates page data by operating the HTML generating part 76, extracts image data to be transmitted to the communications means from the storage device, and operates the camera control part 78 upon specifying an imaging mode.

When a screen setting request is made for changing the portal screen from the computer device 65, the control part 77 of the network camera 64a reads-out setting screen display data stored in the screen display data storage part 74a, and transmits the data to the computer device 65. By using a setting screen (see FIG. 17(a) described later) displayed based on this, when an automatic setting request is made through a graphical interface, the automatic setting execution means 77c of the network camera 64a that received this request broadcasts a registration data transmission request for requesting registration data into the LAN 61.

The network cameras 64b and 64c within the LAN 61 receive this UDP packet, and the registration data transmission part 77f extracts IP addresses, port numbers, MC addresses, and host names registered in the address data storage part 74c, and generates and uni-casts a registration data response to the network camera 64a. The table registration means 77d of the network camera 64a extracts MAC addresses, IP addresses, port numbers, and host names from the data area of the received packet, and completes the display camera management table shown in FIG. 18. It is also possible that the MAC addresses, IP addresses, and port numbers are extracted from the header area of the received packet.

Furthermore, describing the setting screen to be inputted by the graphical user interface, the screen display shown in FIG. 17(a) is a setting screen that displays the setting screen display data in HTML, etc., on the computer device 65. IP address boxes 83, port boxes 84, registration data display boxes of the host name boxes 84, and delete buttons 86 for deleting data displayed in these boxes, an automatic setting button 87 for making an automatic setting request, and a manual setting button 88 are displayed. Furthermore, a register button 89 is provided which, when registration data is displayed, can settle the contents thereof by being depressed.

A cancel button 80 which can cancel all of the registration data displayed on the setting screen is provided. The reference numeral 31 denotes registration numbers of the network cameras 64a, 64b, and 64c which can display images, and are associated with layout of images of portal screen display data. The network camera 64a is always registered as a registration number 1. All inputs on the delete buttons 86, the automatic setting button 87, the manual setting button 88, the register button 90, and the cancel button 80 can be made by using a mouse, etc.

Subsequently, operation for reflecting network data on the setting screen is described. When a screen setting request is made, on a setting screen displayed on the computer device 65, as shown in FIG. 17(a), a template is displayed as it is while leaving the IP address boxes 83, the port boxes 84, and the host name boxes 85 as blank. Thereafter, the automatic setting execution means 77c broadcasts the registration data request, the table registration means 77d extracts the MAC addresses, the IP addresses, the port numbers, and the host names of the source network cameras 64 from the registration data response to create a display camera management table. Then, the control part 77 registers the display camera management table in the network camera table storage device 74d.

Thereafter, when the data reflection execution means 77e commands the image display data generating part 76 to display network data on a template of setting screen display data, the screen display data generating part 76 reads setting screen display data from the screen display data storage part 74a, and reads network data from the display camera management table storage device 74d, generates and transmits setting screen display data as shown in FIG. 17(b) indicating the network data on the template, and the computer device 65 displays the setting screen display data (display camera registration screen display data).

For example, on the display camera registration screen shown in FIG. 17(b), the IP address "192.168.0.151," the port number "8001," and the host name "camera001" are indicated for the network camera 64a, the IP address "192.168.0.152," the port number "8002," the host name "camera002" are indicated for the network camera 64b, and the IP address "192.168.0.153," the port number "8003," and the host name "camera003" are indicated for the network camera 64c. In the display camera management table shown in FIG. 18, MAC addresses that are not indicated on the display camera registration screen are registered in the registration sequence.

Namely, for the network camera 64a, the MAC address "0080FF445510" extracted from the registration data response is registered by being associated with the IP address, the port number, and the host name. Likewise, the MAC address "0080FF445520" is registered for the network camera 64b and the MAC address "0080FF445530" is registered for the network camera 64c while being associated. The network data of the network camera 64a is extracted from the mapping table of the address data storage part 94c and displayed.

By using these, for example, images named "image.jpg" can be requested for the network cameras 64b and 64c by describing <img src=http://192.168.0.152:8002/image/image.jpg>, etc., by using the IP addresses and the port numbers by the screen display data generating part 76, and when a DDNS server (not shown) is usable, images can be requested by <img src=http://xxx.net/camera002/image/image.jpg> by using the host names.

When portal screen display data listing images of the network cameras 64a, 64b, and 64c is generated, by registering this by depressing the register button 89, a display camera management table of the display camera management table storage device 74d is settled. Then, the multi-image screen shown in FIG. 16(b) is displayed. The reference numeral 21 denotes a single image screen, and 22 denotes a multi-image screen.

To display portal screen display data listing images of the network cameras 64a, 64b, and 64c, access to a predetermined URL of, for example, the network camera 64a is made from a terminal within the LAN 61 (for example, the computer device 65). When access is made from the terminal within the LAN 61 by specifying a predetermined URL, the control parts 77 of the network cameras 64 extract screen display data of an access multi-image screen 22 from the storage devices 74, and transmits the data to the terminal within the LAN 61.

On the other hand, the data is transmitted by deleting the data of the network cameras 64b and 64c and depressing the delete button 89, the single image screen shown in FIG. 16(a) while displaying the image of the network camera 64a singly is displayed.

Manual setting is made by inputting letters and numerals into the boxes (IP address boxes 83, the port boxes 84, and host name boxes 85) of the display camera registration screen from an input means (not shown) of the computer device 65 and depressing the manual setting button 88. By this operation on the input means, a manual setting request containing data inputted in the boxes is transmitted to the network cameras 64a, 64b, and 64c. The network cameras 64a, 64b, and 64c register the input data transmitted from the computer device 65 into the display camera management table.

Next, the automatic setting sequence of Embodiment 3 is described. FIG. 19 shows a sequence chart for automatic setting. A screen setting request is made by the computer device 65 (sq1). The control part 77 of the network camera 64a reads setting screen display data, and transmits it to the computer device 65 (sq2). When an automatic setting request is made based on this (sq3), the automatic setting execution means 77c of the network camera 64a which has received this request broadcasts a registration data transmission request (sq4). The network camera 64b uni-casts a registration data response to the network camera 64a (sq5). Likewise, the network camera 64c also uni-casts a registration data response to the network camera 64a (sq6).

The table registration means 77d of the network camera 64a extracts a MAC address, an IP address, and a port number of the source from the received packet, completes a display camera registration table, generates display camera registration screen display data, and transmits an automatic setting response to the computer device 65 (sq7). When a registration request is made through the display camera registration screen (sq8), the network camera 64a settles the display camera management table (sq9).

Thus, the network camera and programs and the network system of Embodiment 3 of the invention can be applied to a network camera which can realize image display of portal screen display data in a list of a plurality of images easily, and sets single display also.

In Embodiment 3, when an automatic setting request is received from the computer device 65, the operation of automatic setting is started, however, it is also possible that the automatic setting is started by timing of turning-ON or resetting of the network cameras 64.

Furthermore, in Embodiment 3 of the invention, automatic generation of screen display data of the access multi-image screen 72 from the inside of the LAN 61 is described, however, screen display data of the access multi-image screen 22 from the Internet 1 may be automatically generated. In this case, the automatic setting execution means 77c of the network camera 64a requests port numbers for the network cameras 64b and 64c assigned in the port forwarding table of the router 63, the WAN side IP address and the host name of the router 63 as a registration data transmission request to the network cameras 64b and 64c, and on the other hand, the table registration means 77d completes a display camera management table by extracting these data from the received packet, generates a display camera registration screen display data, and transmits an automatic setting response to the computer device 65. Then, when a registration request is made through the display camera registration screen, the network camera 64a settles the display camera management table. Thereby, screen display data of the access multi-image screen 22 from the Internet 1 is automatically generated.

It is also possible that the screen display data of the access multi-image screen 22 from the inside of the LAN 61 and the screen display data of the access multi-image screen 22 from the Internet 1 are both automatically generated. In this case, for example, the automatic setting execution means 77c of the network camera 64a makes a request for, as a registration data transmission request to the network cameras 64b and 64c, port numbers of the network cameras 64b and 64c assigned in the port forwarding table of the router 63, the WAN side IP address of the router 63, and the IP address, the port number, and the host name of the requesting network camera 64a, and on the other hand, the table registration means 77d extracts these data from the received packet, completes a display camera management table for access from the inside of the LAN 61 and a display camera management table for access from the Internet 1, generates display camera registration screen display data, and transmits an automatic setting response to the computer device 65. Then, when a registration request is made through the display camera registration screen, the network camera 64a settles the display camera management table. Thereby, a multi-image screen for access from the inside of the LAN 61 and a multi-image screen for access from the Internet 1 are automatically generated. Then, by providing an access source detection means (not shown) in the network camera 64, it is determined which of the multi screens is to be displayed on the basis of the IP address of the multi-image screen request source.

When the IP address of the multi-image request source screen is the IP address within the LAN 61, the multi-image screen for access from the inside of the LAN 61 is displayed, and when it is not the IP address within the LAN 61, the multi-image screen for access from the Internet 1 is displayed.

Thus, this embodiment can be applied to a network camera and programs, and a network system which can easily display the plurality of images to be displayed on portal screen display in a list, and can also set display of a single image.
(Embodiment 4)

Figure 20:
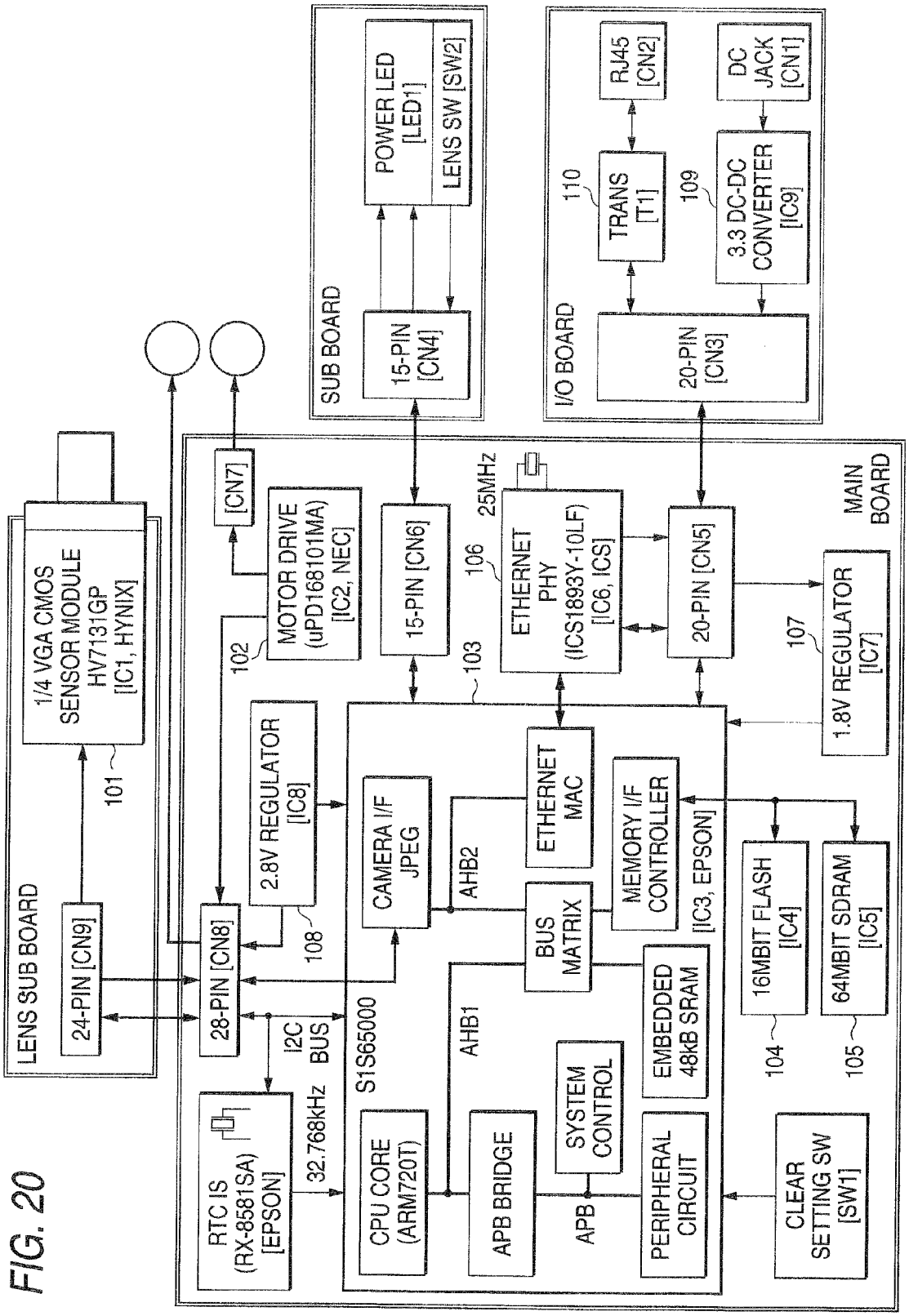
FIG. 20 is a block diagram showing a detailed construction realizing the functions of network cameras of embodiments of the invention.

Hereinafter, a network camera in each embodiment of the invention is described in detail. The detailed hardware configuration realizing the functions of the network camera shown in FIG. 2 and FIG. 7 is shown in FIG. 20. In FIG. 20, the CMOS sensor module 101 realizes the camera part 12, which is, for example, HV7131GP made by Hynix. The motor driver IC 102 realizes the camera control part 19, which is, for example, uPD168101MA made by NEC.

The system LSI 103 realizes the image data generating part 13, the camera control part 19, the drive part 18, the control part 17, the HTML generating part 16, the web server part 15, and the network I/F 11. This system LSI 103 is SIS65000 made by EPSON, and realizes various functions by reading control programs into a central processing unit (CPU Core).

The reference numerals 104 and 105 denote a Flash ROM and SDRAM realizing the storage device 14. The Flash ROM IC-104 is, for example, a 16 Mbit Flash ROM (MX29LVI60ATXEC-70G) made by MACRONIX, and the SDRAM IC-105 is, for example, a 64 Mbit SDRAM (HY57V641620HGTP-H) made by HYNIX.

The reference numeral 106 denotes an Ethernet PHY IC realizing the network I/F 11, and is, for example, ICS1893Y-10LF made by ICS. The reference numerals 107, 108, and 109 denote power source ICs realizing the power source part 27, and 107 denotes, for example, a 1.8V regulator XC6209B182MR made by TOREX SEMICONDUCTOR. The reference numeral 108 denotes, for example, a 2.8V regulator XC6209B182MR made by TOREX SEMICONDUCTOR.

The reference numeral 109 denotes, for example, a 3.3V DC-DC converter R1224N332G-TR-FA made by RICOH. The reference numeral 110 denotes an Ethernet transformer as a part of the network I/F 11, and is, for example, NT-84020T made by GOLDEN REGENT ELECTRONICS INDUSTRIAL.

The hardware configuration realizing the functions of the network camera shown in FIG. 15 is also similar to that of FIG. 20.

This application is based upon and claims the benefit of priorities of Japanese Patent Applications No. 2004-3868 filed on Jan. 9, 2004, and Nos. 2004-118616 and 2004-118617 both filed on Apr. 14, 2004, the contents of which are incorporated herein by reference in its entirety.

Figure 6:
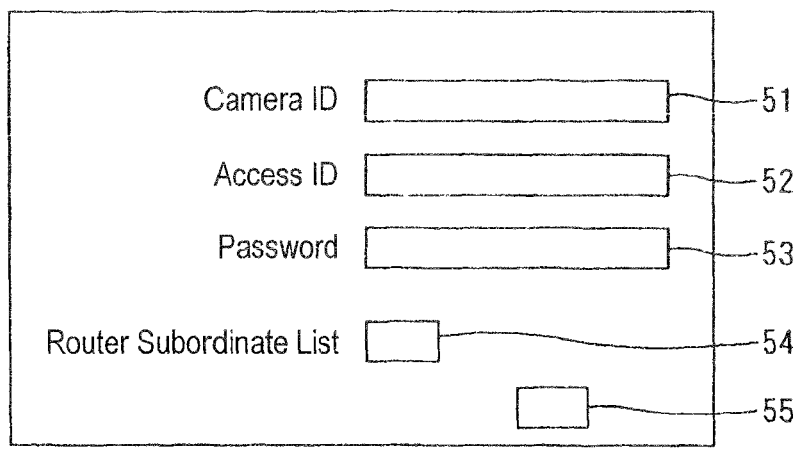
FIG. 6(*a*) is an explanatory view of a network camera specification and authentication web page to be transmitted by the management server of Embodiment 1 of the invention, FIG. 6(*b*) is an explanatory view of a network camera list specification web page to be transmitted by the management server of Embodiment 1 of the invention, and FIG. 6(*c*) is an explanatory view of a network camera individual specification web page to be transmitted by the management server of Embodiment 1 of the invention.
Figure 6:
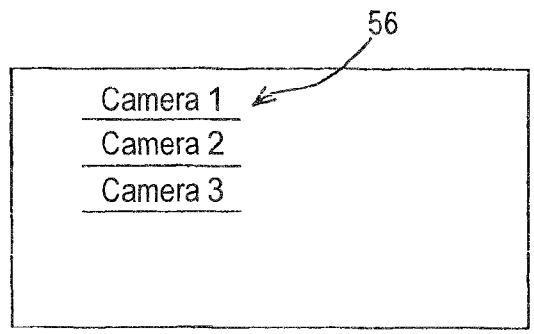
Figure 6:
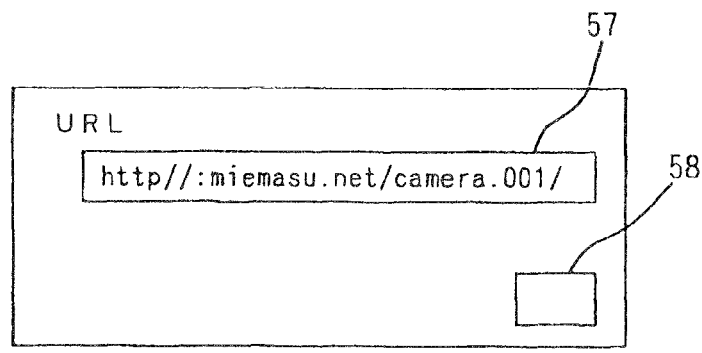
Figure 17:
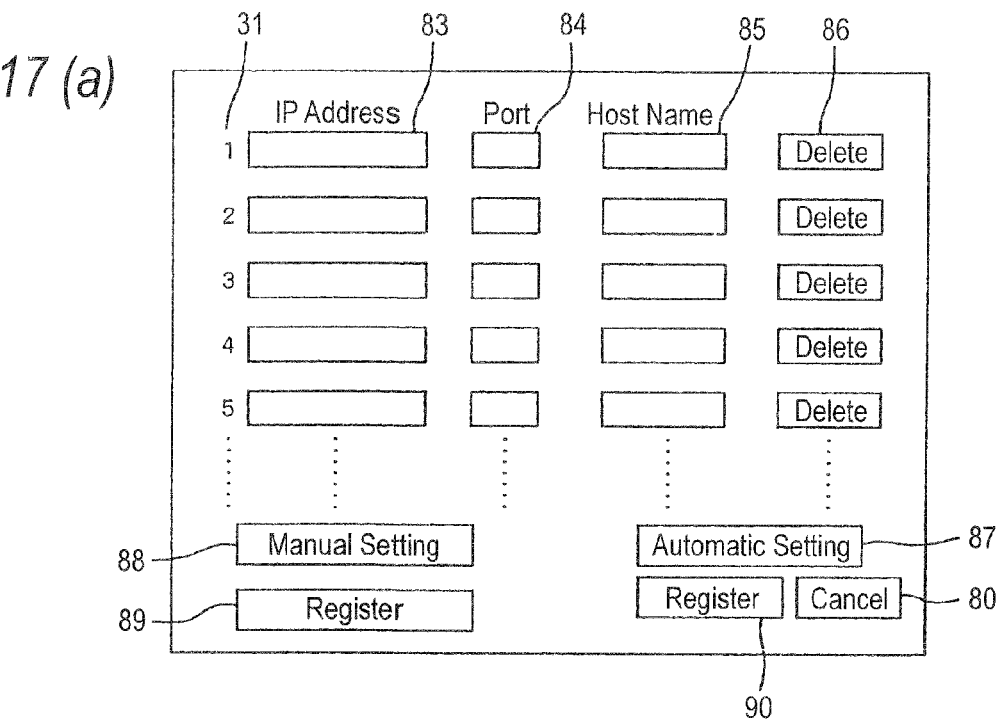
FIG. 17(*a*) is an explanatory view of a setting screen in Embodiment 3 of the invention, and FIG. 17(*b*) is an explanatory view of a display camera registration screen in Embodiment 3 of the invention.

[FIG. 1] [FIG. 14]
1 Internet
[FIG. 2]
12 Camera part
13 Image data generating part
15 Web server part
18 Drive part
19 Camera control part
11 Network I/F
Internet
17 Control part
16 HTML generating part
14 Storage device
14a HTML storage part
14b Image storage part
14c Port data storage part
14d Management server data storage part
27 Power source part
[FIG. 3]
23 Control part
24 HTML generating part
22 Web communications part
21 Network I/F
Internet
25 Storage part
25a HTML storage part
25b Server management table storage part
[FIG. 4]
41 Camera ID
42 Access ID
43 Password
44 Port number
45 Local IP address
46 Internal port number
47 External IP address
48 Group ID
[FIG. 5]
Image server
Router
Access destination DB server
Terminal
Forwarding setting request sq1
Setting
Setting notification sq2
Setting data notification sq3
Registration
Access sq4
Server specification authentication request sq5
Server specification authentication data notification sq6
Transfer web page transmission sq7
Access sq8
Control screen web page transmission sq9
[FIG. 6]
Camera ID
Access ID
Password
Router subordinate list
56 Camera 1
Camera 2
Camera 3
[FIG. 7]
12 Camera part
13 Image data generating part
15 Web server part
18 Drive part
19 Camera control part
11 Network I/F
Internet
17 Control part
16 HTML generating part
14 Storage device
14a HTML storage part
14b Image storage part
14c Address data storage part
27 Power source part
[FIG. 8]
23 Control part
23a Timer
24 HTML generating part
26 DDNS function part 22 Web communications part
21 Network I/F
Internet
25 Storage part
25a HTML storage part
25b Management table storage part
[FIG. 9]
41 MAC address
42 Access ID
43 Password
44 WAN side port number
45 IP address
46 LAN side port number
47 WAN side IP address
48 Domain name
[FIG. 10]
33a DHCP function means
33b UPnP function means
33c Web server part
Control part
34a Port forwarding table
34 Storage device
35 Display means
[FIG. 11]
(1)
(A) Setting sequence
(B) Internet connection check sequence
(C) Confirmation sequence
(D) Domain name setting sequence
(E) Image browsing sequence
(F) Update sequence
(2)
Computer device
sq2 Network setting notification
sq3 ID and Password setting
(3)
Network camera
sq1 IP address assignment
sq4 Port number assignment
sq5 Internet connection check request
sq6 HTTP request
sq7 HTTP response
sq8 Internet connection check result response
sq9 Registration message
sq12 Domain name registration
sq15 Image delivery
sq00 Update
(4) Router
Network
Management server
Terminal
(5)
sq10 Confirmation screen request
sq11 Confirmation screen transmission
sq13 Domain name
sq14 URL transmission
[FIG. 12]
Port forwarding table
WAN side IP address
WAN side port number
IP address
LAN side port number
Management server
Network camera
Network camera
IP address
LAN side port number
Router
WAN side IP address
Management server
WAN side IP address
WAN side port number
Internet connection check request
Notify IP address, MAC address, and port number (sq5)
Destination
Transmission source
HTTP request
HTTP response
Notify MAC address (sq7)
Time out?
MAC match?
Success of connection
Failure of connection
Internet connection check result response (sq8)
[FIG. 13]
Step 1 Network setting
Step 2 Port forwarding setting
Step 3 Transmit Internet connection check request/Notify the MAC, IP address, and port number
Step 4 Management server can make HTTP request?
Step 5 Network camera can make HTTP response?
Step 6 Mac addresses match?
Step 7 Judge success
Step 9 Connection check result response
Step 10 Affirmative response notified?
Step 11 Register the MAC, IP address, and port number
Step 14 Confirmation sequence
Step 15 Register domain name in management server
Step 16 Image request by domain name
Step 17 Image delivery
Step 8 Judge failure
Step 13 Manual setting
Step 12 Negative response notified?
FIG. 15
(a)
72 Camera part
73 Image data generating part
75 Web server part
78 Drive part
79 Camera control part
71 Network I/F
74 Storage part
74a Image display data storage part
74b Image storage part
74c Address data storage part
74d Display camera management table storage part
77 Control part
76 Image display data generating part
(b)
64b, 64c Camera
77 Control part
77f Registration data transmission means
75 Web server part
64a Access destination camera
77c Automatic setting execution means
Transmission
77d Table registration means
Receiving
Display camera management table
77e Data reflection execution means
74c Address data storage part
Setting screen display data
76 Screen display data generating part
Display camera registration screen display data Transmission
[FIG. 16]
Single image screen
Multi-image screen
[FIG. 17]
(a)
83 IP address
84 Port
85 Host name
86 Delete
88 Manual setting
89 Register
87 Automatic setting
90 Register
80 Cancel
(b)
Display camera registration screen
[FIG. 18]
Display camera table
Register number
Host name
MAC address
IP address
Port number
[FIG. 19]
(1)
Computer device 5
Screen setting request sq1
Setting screen display data sq2
Automatic setting request sq3
Automatic setting response sq7
Registration request sq8
(2)
Camera 4a
Registration data transmission request
Registration data response sq5
Registration data response sq6
Registration sq9
(3)
Registration data transmission request (broadcast)

What is claimed is:

1. A management server connectable to a IP device via a router, a global IP address being assigned to the router, the router having a port, the IP device being configured to be connectable to the port, the router being configured to assign a port number of the port to the IP device, the management server comprising:

an interface configured to receive, from the IP device, via the router, the global IP address of the router and the port number assigned to the IP device; and a controller configured to:

receive, via a first session, from the IP device, a first request for the management server to access the IP device;

transmit, in response to the first request in the first session, a second request, via a second session, for the IP device to access the management server, using the global IP address of the router and the port number assigned to the IP device;

judge whether a connection between the IP device and the management server in the second session is successful or not, based on a response to the second request; and transmit, via the first session, to the IP device, a result of the judgment in the second session as a response to the first request.

2. The management server according to claim 1, wherein the global IP address and the port number is are in a form of a URL.

3. The management server according to claim 1, further comprising a timer, and wherein, when the controller does not receive the response to the access to the one IP device within a predetermined time period from accessing the one IP device via another session, the controller transmits a notification indicating that the global IP address of the router and the port number assigned to the one IP device is not activated.

4. The management server according to claim 1, further comprising a memory configured to store the global IP address of the router and the port number assigned to the IP device.

5. The management server according to claim 1, wherein the first request is made via HTTP.

6. The management server according to claim 1, wherein the second request is made via HTTP.

7. The management server according to claim 1, wherein the first request includes a first MAC address which is the MAC address of the IP device.

8. The management server according to claim 7, wherein the response to the second request includes a second MAC address, and the controller judges whether the connection between the IP device and the management server in the second session is successful or not by comparing the first MAC address with the second MAC address.

* * * * *